(12) United States Patent
Branum et al.

(10) Patent No.: US 12,528,714 B2
(45) Date of Patent: Jan. 20, 2026

(54) AUTONOMOUS CHEMICAL DOSING SYSTEM AND METHODS OF USE THEREOF

(71) Applicant: Evoqua Water Technologies LLC, Pittsbrugh, PA (US)

(72) Inventors: Scott Branum, Birmingham, AL (US); Marc Gau, Sarasota, FL (US); Calvin Horst, Sarsota, FL (US)

(73) Assignee: Evoqua Water Technologies LLC, Pittsburgh, PA (US)

( * ) Notice: Subject to any disclaimer, the term of this patent is extended or adjusted under 35 U.S.C. 154(b) by 691 days.

(21) Appl. No.: 17/799,436

(22) PCT Filed: Feb. 12, 2021

(86) PCT No.: PCT/US2021/017744
§ 371 (c)(1),
(2) Date: Aug. 12, 2022

(87) PCT Pub. No.: WO2021/163395
PCT Pub. Date: Aug. 19, 2021

(65) Prior Publication Data
US 2023/0150836 A1 May 18, 2023

Related U.S. Application Data

(60) Provisional application No. 62/975,434, filed on Feb. 12, 2020, provisional application No. 62/975,402, filed on Feb. 12, 2020.

(51) Int. Cl.
*C02F 1/00* (2023.01)
*C02F 1/74* (2023.01)
*C02F 101/10* (2006.01)

(52) U.S. Cl.
CPC ............... *C02F 1/008* (2013.01); *C02F 1/74* (2013.01); *C02F 2101/101* (2013.01);
(Continued)

(58) Field of Classification Search
None
See application file for complete search history.

(56) References Cited

U.S. PATENT DOCUMENTS

| | | | |
|---|---|---|---|
| 4,830,757 A | 5/1989 | Lynch et al. | |
| 2003/0037602 A1* | 2/2003 | Glasgow, Jr. | E21B 49/082 73/61.41 |

(Continued)

OTHER PUBLICATIONS

International Search Report, in corresponding PCT/US2021/017744, dated Jun. 15, 2021.
(Continued)

*Primary Examiner* — Richard C Gurtowski

(57) ABSTRACT

A wastewater treatment management system including a plurality of monitoring stations, a treating station for introducing a treating agent to wastewater, and a principal processing facility for controlling a dose of the treating agent. A system configured to treat a wastewater stream collection system including a source of a treating agent, a metering valve, a sensor, and a controller operatively connected to the metering valve and the sensor. A non-transitory computer-readable medium including instruction that instruct a controller to perform a method of controlling addition of a treating agent into a wastewater stream collection system. A controller for a system configured to treat odor and control corrosion in a wastewater stream collection system that is operatively connectable to a metering valve for administering a treating agent to a wastewater stream collection system.

31 Claims, 6 Drawing Sheets

(52) U.S. Cl.
CPC .... *C02F 2209/008* (2013.01); *C02F 2209/26* (2013.01); *C02F 2209/44* (2013.01); *C02F 2303/02* (2013.01)

(56) References Cited

U.S. PATENT DOCUMENTS

| | | | |
|---|---|---|---|
| 2003/0236649 | A1 | 12/2003 | Kodukula et al. |
| 2007/0074758 | A1* | 4/2007 | McQuade ............... C02F 1/008 |
| | | | 137/561 R |
| 2014/0373926 | A1 | 12/2014 | Jha et al. |
| 2016/0122209 | A1* | 5/2016 | Newman, Jr. ...... B01D 17/0214 |
| | | | 210/744 |
| 2017/0297929 | A1 | 10/2017 | Whitaker et al. |
| 2017/0370893 | A1 | 12/2017 | West |

OTHER PUBLICATIONS

Westgate, Amy, "Requisition by The Examiner in Accordance With Subsection 86(2) of The Patent Rules", Canadian Patent Application No. 3166822, mailed Jun. 28, 2024.

Westgate, Amy, "Requisition by the Examiner in Accordance With Subsection 86(2) of the Patent Rules", Canadian Patent Application No. 3,166,822, mailed Aug. 24, 2023, 3 pages.

Westgate, Amy, "Requisition By The Examiner", Canadian Patent Application No. 3166822, mailed Jun. 4, 2025.

\* cited by examiner

AUTONOMOUS CHEMICAL DOSING SYSTEM AND METHODS OF USE THEREOF

CROSS-REFERENCE TO RELATED APPLICATIONS

This application claims priority under 35 U.S.C. § 119(e) to U.S. Provisional Application Ser. No. 62/975,402, titled "Using Artificial Intelligence to Leverage Public and Private Data for $H_2S$ Abatement and Corrosion Minimization," filed Feb. 12, 2020 and to U.S. Provisional Application Ser. No. 62/975,434, titled "Autonomous Chemical Dosing System and Methods of Use Thereof," filed Feb. 12, 2020, the disclosures of each being incorporated herein by reference in their entireties for all purposes.

FIELD OF TECHNOLOGY

Aspects and embodiments disclosed herein relate to systems and methods for controlling odor in wastewater.

SUMMARY

In accordance with one aspect, there is provided a wastewater treatment management system. The system comprises a plurality of monitoring stations each situated in a wastewater stream collection system, each of the monitoring stations having at least one sensor configured to determine a level of at least one target species at respective locations of the wastewater stream collection system, and to transmit a representation of the determined level of the at least one target species, a treating station disposed at, proximate, or remotely from at least one of the plurality of monitoring stations and configured to introduce at least one treating agent into the wastewater stream collection system at a predetermined dosage rate, and a principal processing facility disposed remotely from at least one of the plurality of monitoring stations, the principal processing facility configured to receive the transmitted representation and to determine an adjusted dosage of the at least one treating agent based on data retrieved from a public database, the principal processing facility further configured to transmit an indicator of the adjusted dosage to the treating station, wherein the treating station is further configured to receive the indicator of the adjusted dosage and introduce the at least one treating agent at the adjusted dosage. In some embodiments, oxygen bubbles or bubbles of an oxygen containing gas introduced into wastewater in the wastewater stream collection system constitutes a treating agent. The oxygen or gas bubbles may be used to manipulate the oxidation-reduction potential of the wastewater.

In some embodiments, the at least one treating agent comprises at least one of an anthraquinone, a pH-adjusting compound, a nitrite, a nitrate, sodium chlorite, hydrogen peroxide, or an iron salt solution.

In some embodiments, each of the plurality of monitoring stations comprises a cellular modem configured to transmit the representation to the processing facility according to a predetermined schedule.

In some embodiments, the system comprises a plurality of treating stations, each treating station configured to introduce the at least one treating agent into the wastewater collection system at respective dosage rates.

In some embodiments, the principal processing facility is configured to adjust operation of one or more of the plurality of treating stations to compensate for undesired operation of one or more other of the plurality of treating stations.

In some embodiments, the data includes environmental data regarding one or more of precipitation, outdoor temperature, outdoor relative humidity, wind speed, wind direction, and atmospheric pressure.

In some embodiments, the at least one sensor is configured to determine a concentration of one of $H_2S$ or a precursor for $H_2S$ in one of air or water within the collection system.

In some embodiments, the system further comprises an aeration system configured to deliver an oxygen containing gas into the wastewater.

In accordance with another aspect, there is provided a method of providing odor and/or corrosion control in a wastewater stream collection system or treatment facility. The method comprises measuring at least one process variable in a wastewater stream collection system, retrieving data for at least one environmental variable from a source of environmental data, determining a treatment dose of a treating agent based on an adjustment factor, the adjustment factor determined responsive to a measurement of the at least one process variable and data received for the at least one environmental variable, the treatment dose being in an amount sufficient to control a concentration of an odorous species in a headspace of the wastewater stream collection system or treatment facility to be less than or equal to a predetermined target value at a point in the wastewater stream collection system, and administering the treatment dose to wastewater in the wastewater stream collection system.

In some embodiments, the at least one process variable is selected from the group consisting of volume of the treating agent previously administered, concentration of the odorous species in the headspace, wastewater composition, wastewater pH, wastewater temperature, wastewater flow rate, wastewater conductivity, wastewater TSS, wastewater TDS, wastewater ORP, biological oxygen demand of the wastewater, chemical oxygen demand of the wastewater, sulfide concentration in the wastewater, residual treating agent in the wastewater, and humidity in the collection system.

In some embodiments, the at least one environmental variable is selected from the group consisting of precipitation outdoor temperature, outdoor relative humidity, wind speed, wind direction, and atmospheric pressure.

In some embodiments, the treatment dose of the treating agent is further based on a baseline dose of the treating agent.

In some embodiments, the baseline dose is predicted based on at least one temporal variable.

In some embodiments, the baseline dose is manually set.

In some embodiments, the method further comprises predicting the baseline dose of the treating agent from historical data regarding concentrations of the odorous species in the headspace.

In some embodiments, the historical data regarding concentrations of the odorous species in the headspace is catalogued by time of day, day of week, month of the year, and annual seasonal data.

In some embodiments, the baseline dose and the treatment dose of the treating agent are the same.

In some embodiments, the at least one process variable includes a concentration of one or more chemical species in one of air in the collection system or wastewater in the collection system.

In accordance with another aspect, there is provided a system configured to treat a wastewater stream collection system. The system comprises a source of a treating agent connectable to the wastewater stream collection system at a point of administration, a metering valve positioned at the point of administration configured to administer the treating agent to the wastewater stream collection system, at least one sensor constructed and arranged to measure at least one process variable from the wastewater stream collection system, and a controller operatively connected to the metering valve and the at least one sensor, the controller configured to regulate an administered dose of the treating agent responsive to a measurement of the at least one process variable in combination with data of at least one environmental variable received and historical data from the at least one sensor, the controller programmable to automatically adjust a treatment dose of the treating agent based on an adjustment factor, the adjustment factor determined responsive to a measurement of the at least one process variable and data on the at least one environmental variable, the treatment dose being in an amount sufficient to control a concentration of $H_2S$ in the wastewater stream collection system to be less than or equal to a predetermined target value.

In some embodiments, the system further comprises an aeration system configured to deliver an oxygen containing gas into wastewater in the wastewater stream collection system.

In some embodiments, the controller is further configured to regulate a rate or volume of the oxygen containing gas delivered into the wastewater responsive to the measurement of the at least one process variable and/or the at least one environmental variable.

In some embodiments, the system further comprises a receiver of data for the at least one environmental variable.

In some embodiments, the at least one process variable is selected from the group consisting of volume of the treating agent previously administered, $H_2S$ concentration in a headspace of the collection system, wastewater composition, wastewater pH, wastewater temperature, wastewater flow rate, wastewater conductivity, wastewater TSS, wastewater TDS, wastewater ORP, and humidity in the collection system.

In some embodiments, the at least one environmental variable is selected from the group consisting of precipitation, outdoor temperature, outdoor relative humidity, wind speed, wind direction, and atmospheric pressure.

In some embodiments, the controller is further programmable to predict a baseline dose of the treating agent sufficient to bring the concentration of $H_2S$ in the wastewater stream collection system to be below the predetermined target value.

In some embodiments, the controller is further programmable to determine the treatment dose based on the baseline dose and the adjustment factor.

In some embodiments, the baseline dose is defined based on at least one temporal variable.

In some embodiments, the historical data from the at least one sensor is catalogued by time of day, day of week, month of the year, and annual seasonal data.

In some embodiments, the at least one sensor is positioned to measure the at least one process variable downstream from the point of administration of the treating agent.

In some embodiments, the controller is further programmable to instruct the metering valve to administer the treatment dose of the treating agent.

In some embodiments, the controller is further configured to regulate the treatment dose of the treating agent responsive to population demographics or traffic.

In some embodiments, the controller is further configured to collect and store data from the at least one process variable measured by the at least one sensor.

In some embodiments, the controller is further configured to collect and store data regarding $H_2S$ concentrations measured in a headspace of the wastewater stream collection system.

In some embodiments, the predetermined target value is from about 5 ppm to about 100 ppm.

In some embodiments, the controller is further configured to alert a user or service provider of a status of the system.

In accordance with another aspect, there is provided a method of retrofitting a system configured to provide treatment in a wastewater stream collection system comprising a source of a treating agent, at least one of a pump and a metering valve configured to facilitate administration of the treating agent to the wastewater stream collection system, at least one sensor constructed and arranged to measure at least one process variable. The method comprises providing a controller configured to regulate an administered dose of the treating agent responsive to a measurement of the at least one process variable in combination with data of at least one environmental variable and cataloged historical data regarding concentrations of $H_2S$ in a headspace of the wastewater stream collection system, the controller connectable to the at least one of the metering valve and the pump and to the at least one sensor.

In some embodiments, the controller is connected to or connectable to a receiver of data for the at least one environmental variable.

In some embodiments, the controller is connected to or connectable to a user interface configured to alert a user or service provider of a status of the system.

In some embodiments, the controller is connected to or connectable to a user interface configured to allow a user or service provider to define predetermined values associated with the at least one process variable.

In some embodiments, the controller is connected to or connectable to a user interface configured to allow a user or service provider to define the predetermined value of the $H_2S$ concentration in the headspace of the wastewater stream collection system.

In some embodiments, the at least one process variable is selected from the group consisting of volume of the treating agent previously administered, $H_2S$ concentration in the headspace, wastewater composition, wastewater pH, wastewater temperature, wastewater flow rate, wastewater conductivity, wastewater TSS, wastewater TDS, wastewater ORP, or humidity in the collection system.

In some embodiments, the at least one environmental variable is selected from the group consisting of precipitation, outdoor temperature, outdoor relative humidity, wind speed, wind direction, and atmospheric pressure.

In some embodiments, the controller is further configured to regulate the administered dose based on at least one temporal variable.

In some embodiments, the cataloged historical data regarding concentrations of $H_2S$ in the headspace is cataloged by time of day, day of week, month of the year, and annual seasonal data.

In accordance with another aspect, there is provided a method of facilitating wastewater treatment. The method comprises providing a system configured to treat odor and control corrosion in a wastewater stream collection system, the system comprising a source of a treating agent, a metering valve configured to administer the treating agent to the wastewater stream collection system, at least one sensor constructed and arranged to measure at least one process variable, and a receiver of data for at least one environmental variable, and providing a controller configured to regulate an administered dose of the treating agent responsive to a measurement of the at least one process variable in combination with data regarding the at least one environmental variable and cataloged historical data regarding concentrations of $H_2S$ in a headspace of the wastewater stream collection system.

In some embodiments, the method further comprises providing the treating agent.

In some embodiments, the method further comprises instructing a user to establish a connection between the controller and a cloud-based memory storage configured to process and store data associated with historic values of the at least one process variable, the at least one environmental variable, and cataloged historical data regarding concentrations of $H_2S$ in a headspace of the wastewater stream collection system.

In some embodiments, the method further comprises informing a user or service provider of a status of the system.

In some embodiments, the method further comprises informing a user or service provider of a need to replenish a source of the treating agent, the method further comprising providing the treating agent responsive to the alert.

In some embodiments, the cloud-based memory storage is configured to alert a user or service provider of maintenance and/or service requirements of the system.

In some embodiments, the status of the system comprises a volume of the treating agent used in treating the wastewater stream collection system, the volume of the treating agent transmitted to a billing system connected to a user account.

In some embodiments, the at least one process variable is selected from the group consisting of volume of the treating agent previously administered, $H_2S$ concentration in the headspace, wastewater composition, wastewater pH, wastewater temperature, wastewater flow rate, wastewater conductivity, wastewater TSS, wastewater TDS, wastewater ORP, or humidity in the collection system.

In some embodiments, the at least one environmental variable is selected from the group consisting of precipitation, outdoor temperature, outdoor relative humidity, wind speed, wind direction, and atmospheric pressure.

In some embodiments, the method further comprises programming the controller to regulate the dose administered based on at least one temporal variable.

In some embodiments, the cataloged historical data regarding concentrations of $H_2S$ in the headspace is catalogued by time of day, day of week, month of the year, and annual seasonal data.

In accordance with another aspect, there is provided a non-transitory computer-readable medium having computer-readable signals stored thereon that define instructions that, as a result of being executed by a controller, instruct the controller to perform a method of controlling addition of a treating agent into a wastewater stream collection system comprising acts of defining a baseline dose of a treating agent sufficient to bring a concentration of an odorous species in a headspace of the wastewater stream collection system to be below a predetermined target value, determining a treatment dose of the treating agent based on the baseline dose and an adjustment factor, the adjustment factor determined responsive to a measurement of at least one process variable and data regarding at least one environmental variable received from a source of environmental data, and generating an output signal configured to actuate a metering valve to administer the treatment dose to wastewater in the wastewater stream collection system.

The non-transitory computer readable medium may be located in a controller located proximate or at the wastewater stream collection system or at a location distant from the wastewater stream collection system, for example, in a cloud-based computer system or centralized control system of a vendor responsible for maintenance of multiple wastewater stream collection systems.

In some embodiments, the method of operating the water filtration system further comprises acts of generating an output signal configured to alert a user or service provider of a status of the system.

In accordance with another aspect, there is provided a controller for a system configured to treat odor and control corrosion in a wastewater stream collection system, the controller being operably connectable to a metering valve configured to administer a treating agent to the wastewater stream collection system, at least one sensor constructed and arranged to measure at least one process variable, and a receiver of data for at least one environmental variable. Th controller comprises a system processor coupled to a memory device storing instructions, the controller configured to execute a decoder function configured to program the system processor to provide the instructions to the decoder function. The instructions comprise prediction of a baseline dose of a treating agent sufficient to bring a concentration of $H_2S$ in a headspace of the wastewater stream collection system to be below a predetermined target value from cataloged historical data regarding a concentration of $H_2S$ in a headspace of the wastewater stream collection system, receipt of the measured values of the at least one process variable and transmission of said measured values to the decoder function, determination of a treatment dose of the treating agent based on the baseline dose and an adjustment factor, the adjustment factor determined responsive to the measured values of at least one process variable and data regarding at least one environmental variable received from a source of environmental data, the treatment dose being in an amount sufficient to control the $H_2S$ concentration in the headspace of the wastewater stream collection system to be less than the predetermined target value along a length of the wastewater stream collection system, and generation of an output signal configured to actuate the metering valve to administer the treatment dose to wastewater in the wastewater stream collection system.

In some embodiments, the controller is operably connected to or connectable to a user interface configured to alert a user or service provider of a status of the system.

In some embodiments, the user interface is configured to allow the user or service provider to define predetermined values associated with the at least one process variable.

In some embodiments, the user interface configured to allow the user or service provider to define the predetermined value of the $H_2S$ concentration in the headspace of the wastewater stream collection system.

In some embodiments, the status of the system comprises a volume of the treating agent used in treating the wastewater stream collection system, the volume of the treating agent transmitted to a billing system connected to a user account.

In accordance with another aspect, there is provided a system for administering at least one treating agent in a wastewater stream collection system. The system comprises a controller including a system processor coupled to a memory device storing an algorithm, the controller configured to transmit data corresponding to at least one process variable measured by at least one sensor within the wastewater stream collection system and at least one environmental variable pertaining to an environment proximate the wastewater stream collection system to the algorithm to cause the controller to perform acts including at least determining a baseline dose of the at least one treating agent sufficient to bring a concentration of $H_2S$ in a headspace of the wastewater stream collection system to be at or below a predetermined target value, determining a treatment dose of the at least one treating agent based on the baseline dose and an adjustment factor, the adjustment factor determined based on at least the measured values of at least one process variable and data regarding at least one environmental variable, the treatment dose being in an amount sufficient to control the $H_2S$ concentration in the headspace of the wastewater stream collection system to be at or below the predetermined target value, and generating an output signal configured to actuate at least one metering valve of a chemical dosage system to administer the treatment dose to wastewater in the wastewater stream collection system.

In some embodiments, the controller is further configured to determine the treatment dose based on cataloged historical data pertaining to chemical and/or meteorological conditions for the wastewater stream collection system.

In some embodiments, the system is further operably connectable to a component of an aeration system configured to aerate wastewater in the wastewater stream collection system.

In some embodiments, the controller is further configured to determine one or both of a frequency or amount of aeration of wastewater in the wastewater stream collection system based on the data measured for the at least one process variable, data corresponding to the at least one environmental variable, and the treatment dose of the at least one treating agent, and to cause the aeration system to aerate the wastewater in accordance with one or both of the frequency or amount of aeration.

In some embodiments, the adjustment factor is further determined based on data corresponding to at least one social variable selected from one or more of population demographics, population density, traffic patterns in a region proximate the wastewater stream collection system, or activity from one or more social media outlets.

In some embodiments, the adjustment factor is further determined based on data corresponding to at least one of population growth projections, municipal budget, or municipal credit rating from the municipality where the wastewater stream collection system in located.

In some embodiments, the at least one process variable comprises one or more of a volume of the treating agent previously administered, a $H_2S$ concentration in a headspace of the wastewater stream collection system, wastewater composition, wastewater pH, wastewater temperature, wastewater flow rate, or humidity in the wastewater stream collection system.

In some embodiments, the at least one process variable further comprises one or more of wastewater conductivity, wastewater total suspended solids (TSS), wastewater total dissolved solids (TDS), or wastewater oxidation-reduction potential (ORP).

In some embodiments, the at least one environmental variable comprises one or more of current time period, outdoor temperature, outdoor relative humidity, wind speed, wind direction, or atmospheric pressure.

In some embodiments, the at least one environmental variable further comprises one or more of solar flux, precipitation, lunar cycles, or tidal cycles.

In some embodiments, the cataloged historical data comprises one or more of concentrations of $H_2S$ in the headspace cataloged by time period, meteorological data cataloged by time period, lag time between administration of the treatment dose and a change in $H_2S$ concentration in a portion of the wastewater stream collection system, or volume of the treating agent previously administered cataloged by time period.

In some embodiments, the algorithm comprises a machine learning algorithm.

In some embodiments, the machine learning algorithm is configured to be trained using at least cataloged historical data pertaining to one or more of concentrations of $H_2S$ in the headspace cataloged by time period, meteorological data cataloged by time period, cataloged lag times between administration of the treatment dose and changes in $H_2S$ concentrations in a portion of the wastewater stream collection system, or volume of the treating agent previously administered cataloged by time period.

In some embodiments, the system is further configured to adjust the dose of the at least one treating agent in substantially real time based on measured values of at least one process variable, the data regarding at least one environmental variable, and at least one social variable.

In some embodiments, the system is configured to operate the chemical dosage system substantially autonomously.

In some embodiments, the algorithm is configured to define the predetermined target value of the $H_2S$ concentration in the headspace of the wastewater stream collection system based on at least one social variable selected from one or more of population demographics, population density, population growth projections, municipal budget, municipal credit rating, traffic patterns in a region proximate the wastewater stream collection system, or activity from one or more social media outlets.

In some embodiments, the algorithm is configured to adjust one or both of the baseline dose of the treating agent and the adjustment factor at a predetermined frequency.

In some embodiments, the system is further configured to permit a user or operator to override the algorithm and control the chemical dosage system.

In accordance with another aspect, there is provided a system configured to treat a wastewater stream collection system. The system comprises a source of at least one treating agent connectable to the wastewater stream collection system at a point of administration, a chemical dosage system comprising at least one metering valve positioned at the point of administration and configured to administer the at least one treating agent to wastewater in the wastewater stream collection system, at least one sensor constructed and arranged to measure at least one process variable from the wastewater stream collection system, and a controller operatively connected to the chemical dosage system and the at least one sensor, the controller configured to determine a baseline dose of the at least one treating agent sufficient to bring a concentration of $H_2S$ in a headspace of the wastewater stream collection system to be at or below a predetermined target value, determine a treatment dose of the at least one treating agent based on the baseline dose and an adjustment factor, the adjustment factor determined based on at least a measurement of the at least one process variable and data for at least one environmental variable pertaining to an environment proximate the wastewater stream collection system, and generate an output signal configured to actuate the at least one metering valve to administer the treatment dose to the wastewater in the wastewater stream collection system.

In some embodiments, the controller is programmed with an algorithm trained to perform the determination of one or both of the baseline dose of the at least one treating agent or the adjustment factor based on cataloged historical data pertaining to chemical and/or meteorological conditions for the wastewater stream collection system.

In some embodiments, the controller is programmed with an algorithm comprising a neural network.

In some embodiments, the system further comprises an aeration system configured to deliver an oxygen containing gas into the wastewater in the wastewater stream collection system.

In some embodiments, the controller is configured to control the aeration system based on the data measured for the at least one process variable, data corresponding to the at least one environmental variable, and the treatment dose of the at least one treating agent.

In some embodiments, data for the at least one environmental variable comprises at least one of current time period, current precipitation, current outdoor temperature, current outdoor relative humidity, current atmospheric pressure, or wind speed or direction.

In some embodiments, the controller is further programmed to determine the adjustment factor based on data corresponding to at least one social variable selected from population density, traffic patterns in a region proximate the wastewater stream collection system, or activity from one or more social media outlets.

In some embodiments, the at least one process variable comprises at least one of a $H_2S$ concentration in a headspace of the wastewater stream collection system, wastewater temperature, wastewater flow rate, wastewater conductivity, wastewater ORP, or humidity in the wastewater stream collection system.

In some embodiments, the cataloged historical data comprises at least one of concentrations of $H_2S$ in the headspace cataloged by time period, meteorological data cataloged by time period, or volume of the treating agent previously administered cataloged by time period.

In some embodiments, the controller is further configured to automatically regulate the treatment dose of the treating agent responsive to a change in one or more of at least the measurement of the at least one process variable, the measurement of the at least one environmental variable, and data pertaining to the at least one social variable.

In some embodiments, the controller is further configured to collect and store data regarding $H_2S$ concentrations measured in the headspace of the wastewater stream collection system.

In accordance with another aspect, there is provided a method of providing odor and/or corrosion control in a wastewater stream collection system. The method comprises measuring at least one process variable in a wastewater stream collection system, retrieving data for at least one environmental variable pertaining to an environment proximate the wastewater stream collection system from a source of environmental data, determining a baseline dose of a treating agent sufficient to bring a concentration of an odorous species in a headspace of the wastewater stream collection system to be at or below a predetermined target value, determining a treatment dose of the treating agent based on at least the baseline dose and an adjustment factor, the adjustment factor determined from at least a measurement of the at least one process variable or a measurement of at least one environmental variable, and administering the treatment dose to wastewater in the wastewater stream collection system.

In some embodiments, determining the baseline dose of the treating agent and/or determining the treatment dose of the treating agent are performed using a controller operatively connected to at least one sensor in the wastewater stream collection system and a source of the at least one environmental variable.

In some embodiments, the method further comprises training the controller to perform the determining of one or both of the baseline dose of the at least one treating agent or the adjustment factor based on cataloged historical data pertaining to chemical and/or meteorological conditions for the wastewater stream collection system.

In some embodiments, the cataloged historical data comprises one or more of concentrations of the odorous species in the headspace is cataloged by time period, meteorological data cataloged by time period, or volume of the treating agent previously administered cataloged by time period.

In some embodiments, the adjustment factor is further determined based on data corresponding to at least one social variable selected from population demographics, population density, or activity from one or more social media outlets.

In some embodiments, the baseline dose of the treating agent and/or the treatment dose of the treating agent are determined by at least one process variable selected from one or more of a concentration of an odorous species in the headspace of the wastewater stream collection system, wastewater temperature, wastewater flow rate, wastewater TSS, wastewater TDS, or humidity in the wastewater stream collection system.

In some embodiments, the baseline dose of the treating agent and/or the treatment dose of the treating agent are determined by at least one environmental variable selected from one or more of time of day, outdoor temperature, outdoor relative humidity, wind direction, or atmospheric pressure.

In some embodiments, the method further comprises adjusting one or both of the baseline dose of treating agent or the determining of the adjustment factor at a predetermined frequency.

In accordance with another aspect, there is provided a method of retrofitting a system configured to provide treatment in a wastewater stream collection system. The method comprises providing a controller configured to perform acts including at least determine a baseline dose of at least one treating agent sufficient to bring a concentration of $H_2S$ in a headspace of the wastewater stream collection system to be at or below a predetermined target value, determine a treatment dose of the at least one treating agent based on the baseline dose and an adjustment factor, the adjustment factor determined based on at least the measured values of at least one process variable and data regarding at least one environmental variable, the treatment dose being in an amount sufficient to control the $H_2S$ concentration in the headspace of the wastewater stream collection system to be at or below the predetermined target value, generate an output signal configured to actuate at least one metering valve of a chemical dosage system to administer the treatment dose to wastewater in the wastewater stream collection system, and operatively coupling the controller to a sensor for the at least one process variable and to the at least one metering valve of the chemical dosing system.

In some embodiments, the further comprises determining, by the controller, one or both of the baseline dose of the at least one treating agent or the adjustment factor based on cataloged historical data pertaining to chemical and/or meteorological conditions for the wastewater stream collection system.

In some embodiments, the method further comprises determining, by the controller, one or both of the baseline dose of the at least one treating agent or the adjustment factor based on at data corresponding to at least one social variable.

In accordance with another aspect, there is provided a non-transitory computer-readable medium having a computer-readable algorithm stored thereon that defines instructions that, as a result of being executed by a controller, causes the controller to perform a method of controlling the dosage of at least one treating agent into wastewater within a wastewater stream collection system comprising acts of determining a baseline dose of the at least one treating agent sufficient to bring a concentration of $H_2S$ in a headspace of the wastewater stream collection system to be at or below a predetermined target value, determining a treatment dose of the at least one treating agent based on the baseline dose and an adjustment factor, the adjustment factor determined based on at least the measured values of at least one process variable and data regarding at least one environmental variable, the treatment dose being in an amount sufficient to control the $H_2S$ concentration in the headspace of the wastewater stream collection system to be at or below the predetermined target value, and generating an output signal configured to actuate at least one metering valve of a chemical dosage system to administer the treatment dose to wastewater in the wastewater stream collection system.

In some embodiments, wherein the computer-readable algorithm comprises a machine learning algorithm.

BRIEF DESCRIPTION OF THE DRAWINGS

The accompanying drawings are not drawn to scale. In the drawings, each identical or nearly identical component that is illustrated in the various figures is represented by a like numeral. For purposes of clarity, not every component may be labeled in every drawing. In the drawings.

DETAILED DESCRIPTION

Figure 1:
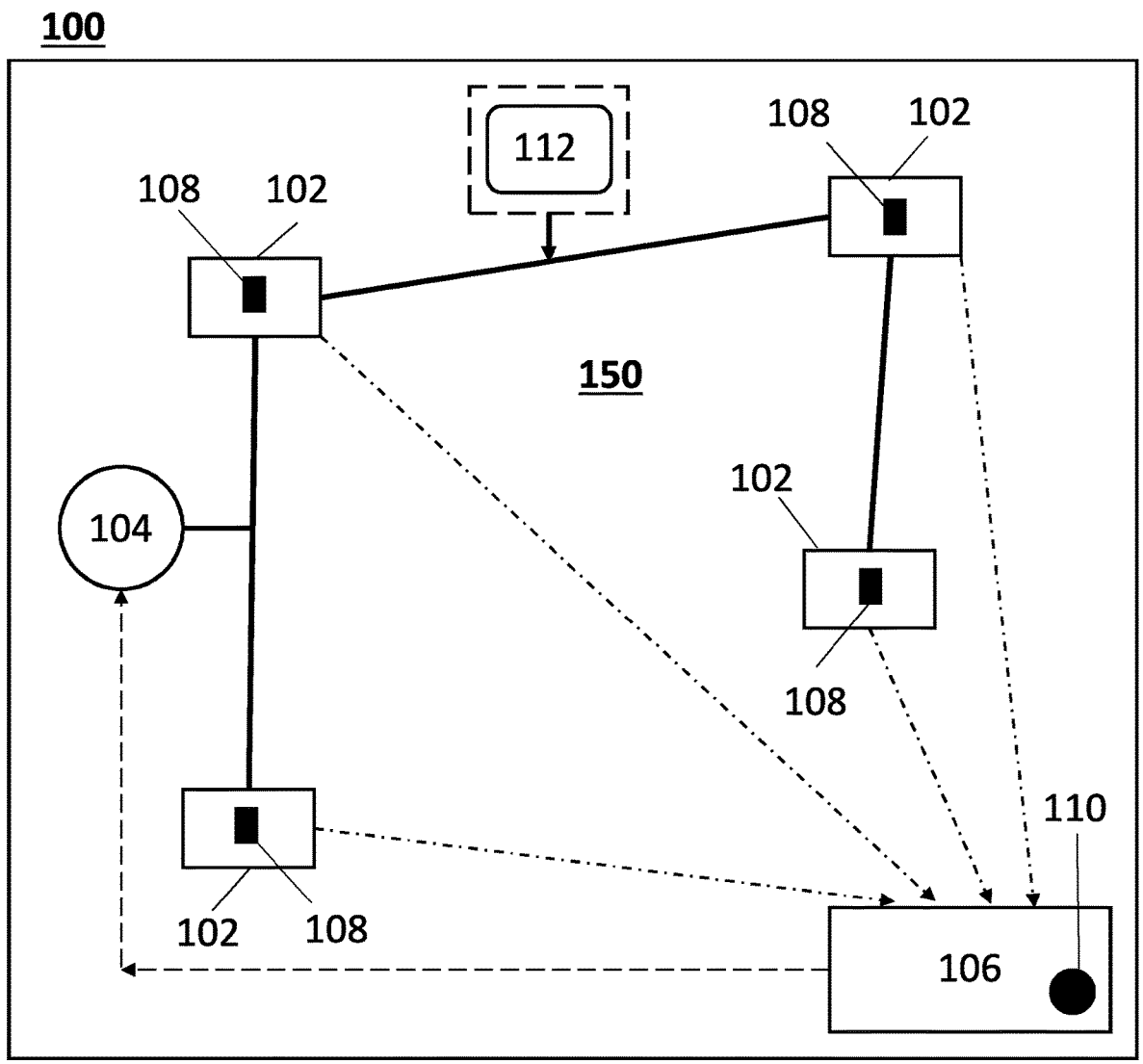
FIG. 1 is a schematic of a wastewater treatment management system, according to an embodiment.

Odor control in wastewater treatment processes can be accomplished by preventing formation of and/or eliminating hydrogen sulfide ($H_2S$) gas or a precursor thereof or other malodorous gases in, for example, a wastewater collection or treatment system. Hydrogen sulfide is a colorless and odorous gas created in wastewater collection systems by the biochemical reduction of sulfate. Sulfate is a naturally occurring substance present in most well water supplies, dissolved naturally therein through geologic contact. Sulfate reducing bacteria are commonly present in wastewater collection and treatment systems. The bacteria may convert sulfate to sulfide ions in wastewater systems deficient of dissolved oxygen, a condition typically occurring when wastewater is pumped long distances. Sulfide ions in turn may react with excess hydrogen ions to form the hydrogen sulfide gas which has an offensive odor. Hydrogen sulfide ($H_2S$) and bisulfide ($SH^-$) are conjugate acids of sulfide ($S^{2-}$).

Hydrogen sulfide generation in wastewater is generally dependent on water temperature, biological oxygen demand (BOD) of the sulfate reducing bacteria, and sulfate level in the wastewater. The highest hydrogen sulfide concentrations generally occur in warm temperature climates and/or in the summer months and at high nutrient locations, such as near a sugar refining facility or where ocean water gets infiltrated into a wastewater system. Humans can sense hydrogen sulfide at very low levels in air. Hydrogen sulfide is particularly offensive in concentrations near about 10 ppm and can cause respiratory paralysis if in excess of about 1000 ppm.

$H_2S$ typically diffuses as a gas in the piping in wastewater stream collection systems, leading to pipe corrosion. Municipal wastewater infrastructure repair and replacement costs due to $H_2S$ corrosion are estimated to be in the billions of dollars over the next ten years. Current treatment methodologies for $H_2S$ abatement include feeding one or more treating agent chemicals into the wastewater to reduce the $H_2S$ levels in the wastewater stream collection system. Mechanical means of abating $H_2S$ concentration are also utilized, include feeding air, use of a force draft aerator, or other similar processes. In typical treatment processes, treating agent chemical are fed to the most problematic areas in the wastewater stream collection system, with a cascading effect expected through the rest of the wastewater system. Treating agent chemicals are typically dosed to wastewater using two methodologies. The first methodology is a baseline feed is where the treating agent chemicals are dosed at a consistent level, irrespective of actual incoming $H_2S$ levels or residual $H_2S$ levels, and a similar baseline methodology is further associated with mechanical $H_2S$ abatement, i.e., mechanical abatement equipment runs at a set level irrespective of incoming or residual $H_2S$ levels. The second abatement methodology is via a dosing curve for chemical treating agents. The dosing curve is typically a pre-determined and scheduled abatement program that anticipates changes in $H_2S$ flow during a period of time, such as a day. For chemical dosing, the chemical feed can be scheduled to ramp up and down or on and off throughout the period of time in an attempt to adjust the dosing based on anticipated incoming $H_2S$ levels. The effectiveness of the dosing curve can be determined by field measurements such as on-site wet testing or through deployed real-time sensors. Typically, when a dosing curve has been first optimized, it may be revisited for seasonal adjustments or to meet specific contractual obligations. There are two primary philosophies employed when considering chemical treatment of wastewater-generated $H_2S$. The first is to overdose the precise amount of chemical required to account for variability in sulfide generation, ensuring there is no sulfide present at the downstream monitoring point. This approach often results in increases cost to the service provider or end user due to excessive treating agent chemical usage. Alternatively, in the second dosing philosophy, treating agent chemicals may be slightly underfed while maintaining sulfide concentrations at a detectable but tolerable level. This second philosophy may lead to intermittent odor complaints and corrosion of wastewater stream collection system infrastructure.

Wastewater may generally be any stream of waste, bearing at least one undesirable constituent, deliverable to a wastewater treatment system for treatment and/or removal. In some embodiments, the undesirable constituents may include organic waste produced by metabolic processes, including human and animal waste. Other undesirable constituents treatable in accordance with one or more embodiments disclosed herein include, but are not limited to, industrial waste, effluents, and sewage. The type and concentration of undesirable constituents present in the wastewater may be site-specific. Communities may establish regulations regarding these undesirable constituents and what may be released from the treatment system. As disclosed herein, wastewater may refer to a stream fed to the system for treatment and a stream treated throughout the system. A process stream generally associated with the treatment system may include wastewater delivered to the system or being processed for treatment by the system.

Wastewater may be associated with a domestic, industrial, commercial, or agricultural source. The wastewater may include surface runoff or stormwater. The wastewater may include any sewer inflow or sewer infiltration. In some embodiments, the wastewater to be treated may have an average temperature between about 4° C. and about 27° C. The wastewater to be treated may have an average pH value of between about 6.5 and 7.5. The wastewater to be treated may have a hydrogen sulfide emission profile dependent on factors such as water turbulence and proximity to a hydrogen sulfide generating area of interest. A headspace of a wastewater collection system may have a $H_2S$ concentration of up to about 2000 ppm. The wastewater to be treated may have a dissolved sulfide concentration dependent on similar factors, including, for example, the source of the wastewater. The dissolved sulfide concentration can be as high as about 25 mg/L.

In accordance with an aspect, there is provided a wastewater treatment management system including a plurality of monitoring stations each situated in a wastewater collection system, a treating station disposed remotely from at least one of the plurality of monitoring stations, and a principal processing facility disposed remotely from at least one of the plurality of monitoring stations. Each of the plurality of monitoring stations may include at least one sensor that is configured to determine a level of at least one target species at respective locations of the collection system. Each sensor of the plurality of the monitoring stations may be further configured to transmit a representation of the determined level of the at least one target species. The treating station may be configured to introduce at least one treating agent into the collection system at a predetermined dosage rate. The principal processing facility may be configured to receive the transmitted representation from the at least one sensor of each of the plurality of monitoring stations and to determine an adjusted dosage of the at least one treating agent based on environmental data retrieved from a public database. The processing facility may be further configured to transmit an indicator of the adjusted dosage to the treating station, which may be configured to receive the indicator of the adjusted dosage and introduce the at least one treating agent at the adjusted dosage.

Each of the plurality of monitoring stations disclosed herein includes at least one sensor, such as a probe or instrument, for monitoring one or more parameters of wastewater entering or exiting any point of the wastewater collection system. The at least one sensor may provide a signal or representation of the measured parameter of the wastewater. The at least one sensor may include, for example, flow meters, water level sensors, conductivity meters, resistivity meters, chemical concentration meters, turbidity monitors, chemical species specific concentration sensors, temperature sensors, pH sensors, oxidation-reduction potential (ORP) sensors, pressure sensors, or any other sensor, probe, or scientific instrument useful for providing an indication of a desired characteristic or parameter of water entering or exiting any one or more of the one or more unit operations. The at least one sensor may be configured to determine a level or concentration of at least one target species at respective locations of the collection system. For example, the target species to be measured may be hydrogen sulfide. Alternatively, or in addition, the target species to be measured may include one or more precursors of hydrogen sulfide, such as sulfide, compounds comprising sulfite ($SO_2$), compounds comprising sulfate ($SO_4^{2-}$), or sulfur-containing amino acids (e.g., methionine, cysteine, homocysteine, or taurine). In such implementations, the at least one sensor may be configured to determine a concentration of one of $H_2S$ or a precursor for $H_2S$ in one of air, such as a headspace of a wastewater transport conduit, or in wastewater within the collection system. Exemplary hydrogen sulfide sensors include the series of VAPORLINK® hydrogen sulfide monitors available from Evoqua Water Technologies (Pittsburgh, PA).

The monitoring stations may be configured to receive the representation of the determined level of the at least one target species from the at least one sensor and transmit the representation to a location configured to receive the transmitted representation and in turn adjust a property of the wastewater treatment management system, such as the dose of at least one treating agent. The transmission of the data representative of the determined level of the at least one target species may occur via a wired transmission protocol, such as broadband internet connection, to a centralized data collection point inside of a principal processing facility or the like. Alternatively, or in addition, the data representative of the determined level of the at least one target species may be gathered wirelessly, for example, by means of the GSM cellular telephone network using a modem connected to a computer or a hand-held device, by Wi-Fi, or other wireless data collection methods known in the art, e.g., based on the LTE Cat 1, LTE Cat M1 or Cat NB1 standard. In such implementations, the plurality of monitoring stations includes the necessary hardware to facilitate wireless transmission, such as a cellular modem, access point, or gateway. The transmission of the representation of the determined level of the at least one target species may occur directly or indirectly. The at least one sensor may be configured to collect data on the representation of the determined level of the at least one target species according to a predetermined schedule. For example, the at least one sensor may be configured to collect data at intervals of minutes, such as every 1 minute, 2 minutes, 3 minutes, 4 minutes, 5 minutes, 6 minutes, 7 minutes, 8 minutes, 9 minutes, 10 minutes, 20 minutes, 30 minutes, 40 minutes, 50 minutes, or 60 minutes. In some implementations, the at least one sensor may be configured to collect data at intervals of hours, such as every 1 hour, 2 hours, 3 hours, 4 hours, 5 hours, 6 hours, 7 hours, 8 hours, 9 hours, 10 hours, 12 hours, 18 hours, or 24 hours. The monitoring station may be configured to transmit the collected data on the representation of the determined level of the at least one target species according to a predetermined schedule. For example, the collected data may be transmitted from the monitoring station at intervals of hours, such as every 1 hour, 2 hours, 3 hours, 4 hours, 5 hours, 6 hours, 7 hours, 8 hours, 9 hours, 10 hours, 12 hours, 18 hours, or 24 hours. In some implementations, the collected data may be transmitted from the monitoring station at intervals of days, such as 1 day, every 2 days, every 3 days, every 4 days, every 5 days, every 6 days, or every 7 days, that is, weekly. The predetermined schedule may be varied by an operator as needed. In other embodiments, the at least one sensor and associated controller or monitoring station may be configured to collect and analyze or transmit the data continuously in real time.

In some implementations, the wastewater treatment management system disclosed herein includes one or more treating stations disposed remotely from at least one of the plurality of monitoring stations. The treating stations may be configured to introduce at least one treating agent into the wastewater stream at various points. In various embodiments, the at least one treating agent may be added to a wastewater stream in a sewer system or other wastewater conduit. In some embodiments, the at least one treating agent may be added to wastewater in a treatment vessel or a pool. In some embodiments, the at least one treating agent may be added to a wastewater stream in a sewer line. In some embodiments, the at least one treating agent may be added to a wastewater stream upstream of a wastewater treatment plant. In some embodiments, the at least one treating agent may be added to a wastewater stream upstream, downstream, and/or at a pumping station. In some embodiments, the at least one treating agent may be added to a wastewater stream upstream, downstream, and/or at a lift station. In some embodiments, the at least one treating agent may be added to a wastewater stream upstream, downstream, and/or at a surge tank.

In some embodiments, treating agents suitable for introduction into wastewater include, but are not limited to, at least one of an anthraquinone, a pH-adjusting compound, a nitrite, a nitrate, hydrogen peroxide, sodium chlorite, or an iron salt solution. For example, the pH may be raised to control hydrogen sulfide generation and odor because at lower pH values, sulfide species are in the form of hydrogen sulfide, which emits offensive odors. The pH may be adjusted by the addition of an alkaline compound. Alkaline compounds which may be added include, for example, a hydroxide selected from the group consisting of alkali hydroxides, alkaline earth hydroxides, alkali earth oxides, and ammonium hydroxides. If appropriate, the alkaline compound can include at least one of sodium hydroxide, potassium hydroxide, calcium hydroxide, and magnesium hydroxide. The addition of pH-elevating compounds may further reduce and/or prevent corrosion through the sewerage system. In some embodiments, the at least one treating agent may comprise a blended composition that includes both immediate release and delayed release components. Blended compositions for odor control in wastewater include those described in PCT/US2019/018162 filed Feb. 19, 2019, the disclosure of which is incorporated herein by reference in its entirety for all purposes. Exemplary treating agents include, but are not limited to, BIOXIDE®, BIOXIDE-AQ®, BIOXIDE Plus 71, ODOPHOS®, and ALKA-GEN®, all available from Evoqua Water Technologies (Pittsburgh, PA).

In some implementations, the wastewater treatment management system disclosed herein includes a principal processing facility disposed remotely from at least one of the plurality of monitoring stations. The principal processing facility may be configured to adjust operation of one or more of the plurality of treating stations to compensate for undesired operation of one or more other of the plurality of treating stations. The principal processing facility may increase or decrease the dosage of the at least one treating agent delivered to the wastewater at a treating station based on one or more measurements at a monitoring station. For example, if a sensor within a monitoring station detects an elevated level of a target species, such as $H_2S$, the signal representative of this measurement may be transmitted to the principal processing facility. The principal processing facility may then determine an adjusted dose of the treating agent to be introduced into the wastewater at that location and the appropriate treating station can introduce the adjusted dosage of the treating agent to the wastewater. Doses of a treating agent may be calculated and adjusted in view of environmental data retrieved from a public database, such as data available from a federal, state, or local government. The environmental data includes data regarding one or more of rainfall, outdoor temperature, outdoor relative humidity, wind speed, wind direction, and atmospheric pressure. Systems as described herein may include a receiver of data for the at least one environmental variable.

In some embodiments, the wastewater treatment management system disclosed herein includes an aeration system configured to deliver an oxygen containing gas into the wastewater. The aeration system may be configured to regulate a rate or volume of the oxygen containing gas delivered into the wastewater responsive to the measurement the at least one environmental variable.

In accordance with an aspect, there is provided a system configured to treat a wastewater stream in a wastewater stream collection system including a source of a treating agent connectable to the wastewater stream collection system at a point of administration, a metering valve positioned at the point of administration configured to administer the treating agent to the wastewater stream collection system, at least one sensor constructed and arranged to measure at least one process variable from the wastewater stream collection system, and a controller operatively connected to the metering valve and the at least one sensor. The controller may be configured to regulate an administered dose of the treating agent responsive to a measurement of the at least one process variable in combination with data regarding at least one environmental variable received and historical data from the at least one sensor. In some embodiments, the controller is programmable to automatically adjust a treatment dose of the treating agent based an adjustment factor. The adjustment factor may be determined responsive to a measurement of the at least one process variable and/or data regarding the at least one environmental variable. The treatment dose may be in an amount sufficient to control a concentration of $H_2S$ in the wastewater stream collection system to be less than or equal to a predetermined target value.

In accordance with an aspect, there is provided a system for administering at least one treating agent in a wastewater stream collection system. The system may include a controller including a system processor coupled to a memory device storing an algorithm. The controller may be configured to transmit data corresponding to at least one process variable measured by at least one sensor within the wastewater stream collection system and at least one environmental variable pertaining to an environment proximate the wastewater stream collection system to the algorithm to cause the controller to perform acts including at least determining a baseline dose of the at least one treating agent sufficient to bring a concentration of $H_2S$ in a headspace of the wastewater stream collection system to be at or below a predetermined target value, determining a treatment dose of the at least one treating agent based on the baseline dose and an adjustment factor, and generating an output signal configured to actuate at least one metering valve of a chemical dosage system to administer the treatment dose to wastewater in the wastewater stream collection system. The adjustment factor may be determined based on at least the measured values of at least one process variable and data regarding at least one environmental variable. The treatment dose may be in an amount sufficient to control the $H_2S$ concentration in the headspace of the wastewater stream collection system to be at or below the predetermined target value.

In accordance with another aspect, there is provided a system configured to treat a wastewater stream collection system. The system may include a source of at least one treating agent connectable to the wastewater stream collection system at a point of administration. The system further may include a chemical dosage system including at least one metering valve positioned at the point of administration configured to administer the at least one treating agent to wastewater in the wastewater stream collection system. The system further may include at least one sensor constructed and arranged to measure at least one process variable from the wastewater stream collection system. The system additionally may include a controller operatively connected to the chemical dosage system and the at least one sensor. The controller may be configured to perform acts including determining a baseline dose of the at least one treating agent sufficient to bring a concentration of $H_2S$ in a headspace of the wastewater stream collection system to be below a predetermined target value, determining a treatment dose of the at least one treating agent based on the baseline dose and an adjustment factor, and generate an output signal configured to actuate the at least one metering valve to administer the predicted treatment dose to wastewater in the wastewater stream collection system. The adjustment factor may be determined based on at least a measurement of the at least one process variable and data measured for at least one environmental variable pertaining to an environment proximate the wastewater stream collection system.

In some embodiments, the controller further may be configured to determine the treatment dose based on cataloged historical data pertaining to chemical and/or meteorological conditions for the wastewater stream collection system. In further embodiments as described herein, the system may be operably connectable to a component of an aeration system configured to aerate wastewater in the wastewater stream collection system. For example, when operably connected to the aeration system, the controller may be configured to determine one or both of a frequency or amount of aeration of wastewater in the wastewater stream collection system based on the data measured for the at least one process variable, data corresponding to the at least one environmental variable, and the treatment dose of the at least one treating agent. In particular embodiments, the controller further may be configured to cause the aeration system to aerate the wastewater in accordance with one or both of the frequency or amount of aeration.

In some embodiments, the adjustment factor for the treating dose further may be determined based on data corresponding to at least one social variable. A social variable, as used herein, includes publicly available data regarding the municipality operating the wastewater stream collection system and the population of persons domiciled proximate the wastewater stream collection system. Examples of social variables may include, but are not limited to, population demographics, population density, population growth projections, municipal budget, municipal credit rating, traffic patterns in a region proximate the wastewater stream collection system, or activity from one or more social media outlets, e.g., FACEBOOK®, TWITTER®, or another similar platform. For example, social media outlets may provide information including events, e.g., concerts, sporting events, and the like, that may impact the production of odorous compounds within the proximity of the wastewater stream collection system, or comments or complaints from persons regarding odor proximate the wastewater stream collection system that may indicate that a change in target odor level may be in order.

In some embodiments, the predetermined target value of $H_2S$ can be a value of below at least about 125 ppm. The predetermined target value of $H_2S$ can be a value of below at least about 100 ppm. The predetermined target value of $H_2S$ can be a value of below at least about 20 ppm. The predetermined target value of $H_2S$ can be a value of below at least about 10 ppm. The predetermined target value of $H_2S$ can be 0 ppm. In some embodiments, the predetermined target value of $H_2S$ can be from about 5 ppm to about 100 ppm. In some embodiments, the predetermined target value of $H_2S$ can be from about 8 ppm to about 12 ppm. In some embodiments, the predetermined target value of $H_2S$ can be from about 5 ppm to about 10 ppm. In some embodiments, the predetermined target value of $H_2S$ can be from about 10 ppm to about 50 ppm. In some embodiments, the predetermined target value of $H_2S$ can be from about 85 ppm to about 125 ppm. In some embodiments, a target maximum concentration of $H_2S$ may be about 10 ppm, or less than about 10 ppm. In some embodiments, a target maximum concentration of $H_2S$ value may be about 100 ppm, or less than about 100 ppm.

The at least one process variable used to determine the adjustment factor may be selected from the group consisting of volume of the treating agent previously administered, a $H_2S$ concentration in a headspace of the wastewater stream collection system, wastewater composition, wastewater pH, wastewater temperature, wastewater flow rate, wastewater conductivity, wastewater total suspended solids (TSS), wastewater total dissolved solids (TDS), wastewater oxidation-reduction potential (ORP), or humidity in the collection system. In other embodiments, process variables may include, but are not limited to, treating agent reservoir levels, pump dosing curves, pumping speed curves, pump pressures, pump vibrational frequencies, wastewater density, chemical quality control documentation, lift station maintenance, lift station data, and wastewater aeration and mixing times. Process variables are typically measured using at least one sensor, such as a probe, transducer, and the like, located at one or more of the plurality of monitoring stations. For example, the at least one sensor is positioned to measure the at least one process variable downstream from the point of administration of the treating agent; that is, at a treating station that is remote from a monitoring station. A representation of the value for any or all of these process variables may then be transmitted to the controller, typically located at a principal processing facility or another central management location.

In accordance with an aspect, there is provided a controller that may be configured to implement any of the methods and systems described herein. The controller may be operably connectable to a metering valve of a chemical dosage system configured to administer a treating agent to the wastewater stream collection system, at least one sensor constructed and arranged to measure at least one process variable, and may include or be operable coupled to a receiver of data for at least one environmental variable. The controller may comprise a system processor coupled to a memory device storing instructions configured to execute a decoder function that is configured to program the system processor to provide the instructions to the decoder function. The controller may be configured to regulate the dose of the treating agent responsive to measured values of environmental and/or process variables as described herein in combination with historical data from the at least one sensor within the system. Historical data refers to catalogued data from the at least one sensor that is organized by time of day, day of week, month of the year, and annual seasonal data for the property the at least one sensor measures. For example, in some non-limiting embodiments, cataloged historical data may include, but is not limited to, one or more of concentrations of $H_2S$ in the headspace cataloged by time period, meteorological data cataloged by time period, a lag time between administration of the treatment dose and a change in $H_2S$ concentration in a portion of the wastewater stream collection system, or volume of the treating agent previously administered cataloged by time period. Historical data for the sensor may be stored within the controller's internal storage, such as RAM or nonvolatile memory, or may be stored on a remote database or similar that the controller is configured to access, such as a database from a Federal agency that collects relevant data, e.g., the National Oceanic and Atmospheric Administration (NOAA). In further embodiments, the controller further may be configured to determine a dosage of the treating agent based on data corresponding to at least one social variable, e.g., population density or activity from one or more social media outlets. In some embodiments, the controller may be configured to collect and store data from the at least one process variable measured by the at least one sensor. For example, the controller may be further configured to collect and store data regarding $H_2S$ concentrations measured in one or more locations within the wastewater stream collection system, such as a headspace of a conduit in the wastewater stream collection system. This collected and stored data may be transmitted to a remote location. In systems that include an aeration system to provide a volume of an oxygen-containing gas to the wastewater, the controller may be configured regulate a rate or volume of the oxygen-containing gas delivered into the wastewater responsive to the measurement of the at least one process variable and/or the at least one environmental variable. An exemplary controller for use in systems and method disclosed herein includes the VERSA-DOSE® automated dosing controller, available from Evoqua Water Technologies (Pittsburgh, PA).

In any embodiment of a controller described herein, the controller may be programmed with an algorithm trained to perform the determination of one or both of the baseline dose of the at least one treating agent or the adjustment factor based on cataloged historical data pertaining to chemical and/or meteorological conditions for the wastewater stream collection system. For example, in some non-limiting embodiments, the algorithm may include a machine learning algorithm. An exemplary machine learning algorithm is a neural net architecture or a neural network. Neural networks are patterned mathematically to acquire, process, and interpret incoming information in a manner similar to the human brain, e.g., by taking input information and passing it along to at least one "neuron," further propagating information until terminating at an output. By passing information along to multiple "neurons," and by adjusting weights given to data values at different neurons based on a comparison between a predicted output and an actual output during training, a neural network is able to improve the way in which it interprets an input signal, i.e., it learns from previous input signals, thereby improving the accuracy of the end result. A neural network algorithm programmed on a controller of this disclosure may be arranged into three components: the input layer, the hidden layer or plurality of layers, and the output layer, and without wishing to be bound by any particular theory, the number of hidden layers is often correlated with the accuracy and learning ability of the neural network. As the number of hidden layers increases, so too may the accuracy of the resulting output variable, e.g., the correct amount of the at least one treating agent to dose the wastewater in the wastewater stream collection system to control the $H_2S$ concentration in a headspace of the wastewater stream collection system to be at or below the predetermined target value. In the algorithms of the present disclosure, data pertaining to each of the variables, e.g., the at least one process variable, the at least one environmental variable, and the at least one social variable, are directed to the input layer, then the plurality of trained hidden layers for iteration, and the output layer which returns the predicted amount of the at least one treating agent to dose the wastewater based on the input variables and their correlation to the conditions of the training data. It is to be appreciated that a neural network is only exemplary, and the invention is not limited by the choice of a neural network (or any specific variant of a neural network) as the machine learning algorithm, and other types of machine learning algorithms are known to those of skill in the art.

In order for a machine learning algorithm, such as a neural network, to be able to understand the information from input data and output an appropriate solution to a problem, it first may be trained using one or more types of data that provide an initial set of conditions representing a "correct" value or series of values for a problem to be iteratively solved. The training data provides a probabilistic value for the "correct" value of a given problem at each input value. In some embodiments, the machine learning algorithm may be configured to be trained using at least cataloged historical data pertaining to one or more of concentrations of $H_2S$ in the headspace is cataloged by time period, meteorological data cataloged by time period, cataloged lag times between administration of the treatment dose and changes in $H_2S$ concentrations in a portion of the wastewater stream collection system, or volume of the treating agent previously administered cataloged by time period. In some embodiments, a data set be segregated into a training set and a validation set where the training set is used to derive a correlative relationship and the validation set is used to determine a level of confidence in the model. As a non-limiting example, a data pool including about 75% of the collected data can be used as the training set to generate a correlative relationship between a measured or observed outcome and one or more of the process variable, the one or more environmental variable, and one or more social variable. The validation set can then be used to determine the deviation from the predicted value, determined utilizing the training set, and the measured or observed outcome. This type of predictive approach may be continually refined as additional data becomes available during operation activities. In some embodiments, the correlations between measured or observed outcomes, e.g., the amount of treating agent dosed and the resultant concentrations of $H_2S$, may be linear or nonlinear. Once correlations are developed, they may be tested by comparing the predicted data from the algorithm to the actual data. This comparison is an iterative process with the goal of continually reducing the error between the predicted and actual $H_2S$ concentration, thus increasing the confidence level that the predicted $H_2S$ concentration is close to the actual.

In some embodiments, the system including a controller with an algorithm as described herein may be configured to adjust the dose of the at least one treating agent in substantially real time based on measured values of at least one process variable, the data regarding at least one environmental variable, and at least one social variable. By substantially real time, it is meant the difference in time between the controller receiving the measured values of at least one process variable, the data regarding at least one environmental variable received from a source of environmental data, and at least one social variable and when it instructs the metering valve of the chemical dosage system to dose the at least one treating agent to wastewater in the collection system is negligible, e.g., less than 10 seconds, less than 5 seconds, or less than 1 second.

In some embodiments, the system including a controller with an algorithm as described herein may be configured to operate the chemical dosage system substantially autonomously, e.g., without the need for an end user or operator to decide when to dose the wastewater in the wastewater stream collection system. In further embodiments, the system including a controller with an algorithm as described herein may be configured to permit a user or operator to override the algorithm and control the chemical dosage system. For example, the algorithm may be configured to define the predetermined target value of the $H_2S$ concentration in the headspace of the wastewater stream collection system as described herein based on at least one social variable selected from one or more of population demographics, population density, population growth projections, municipal budget, municipal credit rating, traffic patterns in a region proximate the wastewater stream collection system, or activity from one or more social media outlets. In further embodiments, the algorithm may be configured to adjust one or both of the baseline dose of the treating agent and the adjustment factor at a predetermined frequency. For example, the algorithm may be configured to sample measured data from the at least one sensor in the wastewater stream collection system at intervals of minutes, such as every 1 minute, 2 minutes, 3 minutes, 4 minutes, 5 minutes, 6 minutes, 7 minutes, 8 minutes, 9 minutes, 10 minutes, 20 minutes, 30 minutes, 40 minutes, 50 minutes, or 60 minutes. In some implementations, the algorithm may be configured to sample measured data from the at least one sensor in the wastewater stream collection system, such as every 1 hour, 2 hours, 3 hours, 4 hours, 5 hours, 6 hours, 7 hours, 8 hours, 9 hours, 10 hours, 12 hours, 18 hours, or 24 hours. The controller further may be configured to adjust one or both of the baseline dose of the treating agent and the adjustment factor at this frequency. Other adjustment schemes are envisioned by this disclosure.

In further embodiments, the system including a controller with an algorithm as described herein may be configured to control the aeration system of a wastewater stream collection system as described herein. For example, the controller may be configured to control the delivery of an oxygen-containing gas to wastewater stream collection system based on the data measured for the at least one process variable, data corresponding to the at least one environmental variable, and/or the treatment dose of the at least one treating agent.

In some embodiments, the controller is further programmable to predict a baseline dose of the treating agent sufficient to bring the concentration of $H_2S$ (or a precursor species thereof) in the wastewater stream collection system to be below the predetermined target value. The baseline dose is the minimum dose of a treating agent that may maintain a concentration of $H_2S$ or a precursor species at or below the predetermined target value. The baseline dose may be defined based on at least one temporal variable, such as historical data related to values of any of the process or environmental variables described herein and treatment doses found sufficient to bring the $H_2S$ concentration to a desired level when these values were previously exhibited. The controller may be further programmable to predict a treatment dose of the at least one treating agent using the determined baseline dose and an adjustment dose determined from the at least one process variable, the at least one environmental variable, and/or the historical data collected and catalogued from the at least one sensor. Once the controller determines the treatment dose of the at least one treating agent to be introduced to the wastewater, the controller may be further programmable to instruct the metering valve to administer the treatment dose of the treating agent by the generation of an output signal configured to actuate the metering valve to administer the treatment dose to wastewater in the wastewater stream collection system. In some embodiments, the controller may be further programmable to regulate the treatment dose of the of the at least one treating agent response to location-specific variables, such as population demographics, traffic, and business climate near the wastewater stream collection system.

In some embodiments, the controller may be operably connected to or connectable to a user interface configured to alert a user or service provider of a status of the system. The user interface may include a graphical user interface (GUI) that includes a display configured to be interacted with by a user or service provider and output status information of the wastewater stream collection system. In some implementations, the user interface may be configured to allow a user or service provider the ability to define one or more variables of the wastewater stream collection system. For example, the user interface may be configured to allow the user or service provider to define predetermined values associated with the at least one process variable or to define the predetermined value of the $H_2S$ concentration in the headspace of the wastewater stream collection system. In some embodiments, the status of the system may include the volume of the at least one treating agent of the wastewater stream collection system. For example, the user interface may display the total volume remaining in a storage vessel of one of the at least one treating agents. The controller may be configured to receive a measurement of the volume of a treating agent storage vessel and receive a transmitted signal from the storage vessel that the volume of treating agent remaining in the storage vessel has fallen below a predetermined threshold minimum volume. In this configuration, the user interface may alert the user or service provider of the status of the storage vessel, and the controller may transmit the volume of treating agent used to a billing system connected to a user account to debit the account accordingly. The debiting of the user account may be used to schedule a delivery of the treating agent to replenish the storage vessel.

The controller may be implemented using one or more computer systems. The computer system may be, for example, a general-purpose computer such as those based on an Intel CORE®-type processor, a Motorola POWERPC® processor, a Sun ULTRASPARC® processor, a Hewlett-Packard PA-RISC® processor, an NXP model iMX6 microprocessor system with 256 MB of flash and 256 MB of DDR RAM, or any other type of processor or combinations thereof. Alternatively, the computer system may include programmable logic controllers (PLCs), specially programmed, special-purpose hardware, for example, an application-specific integrated circuit (ASIC) or controllers intended for analytical systems.

The controller can include one or more processors typically connected to one or more memory devices, which can comprise, for example, any one or more of a disk drive memory, a flash memory device, a RAM memory device, or other device for storing data. The one or more memory devices can be used for storing programs and data during operation of the odor control system and/or the control subsystem. For example, the memory device may be used for storing historical data relating to the parameters over a period of time, as well as operating data. Software, including programming code that implements embodiments of the invention, can be stored on a computer readable and/or writeable nonvolatile recording medium, and then typically copied into the one or more memory devices wherein it can then be executed by the one or more processors. Such programming code may be written in any of a plurality of programming languages, for example, ladder logic, Python, Java, Visual Basic, C, C#, or C++, Fortran, Pascal, Eiffel, Basic, COBOL, or any of a variety of combinations thereof.

In some embodiments, the algorithm programmed into the controller, e.g., a machine learning algorithm, may have portions distributed among different portions of a larger network-based computing system. For example, a portion of the algorithm may be on a physical memory of a device located at the location housing the chemical dosage system, a separate portion of the algorithm may be located on a computing system positioned in the general vicinity of the wastewater stream collection system, and another separate portion may be located on a server or other network-accessible computing device in a remote location. This configuration, known as EDGE computing, brings computation and data storage closer to the location where it is needed to improve response times and save network bandwidth. The data may be passed between the local device, the computing system positioned nearby, and the remote network-accessible computing device, with the updating of the algorithm using real time data being performed on the remote network-accessible computing device. The updated algorithm may be transmitted to the computing system positioned near the wastewater stream collection system for computing the amount of treating agent to add to the wastewater, with the instructions to do so sent to the computing device of the chemical dosage system positioned at the point of administration.

The sensors, the metering valves, pumps, and any other system components may be either directly connected to the controller or indirectly connected to the controller using a communication network that is operatively coupled to the controller. For example, sensors may be configured as input devices that are directly connected to the controller and metering valves and/or pumps of the source of the treating agent may be configured as output devices that are connected to the controller, and any one or more of the above may be coupled to another ancillary computer system or component so as to communicate with the controller over a communication network. Such a configuration permits one sensor to be located at a significant distance from another sensor or allow any sensor to be located at a significant distance from any system component and/or the controller, while still providing data therebetween.

The controller can include one or more computer storage media such as readable and/or writeable nonvolatile recording medium in which signals can be stored that define a program to be executed by one or more processors. The storage or recording medium may, for example, be a disk or flash memory. In typical operation, the processor can cause data, such as code that implements one or more embodiments of the invention, to be read from the storage medium into a memory device that allows for faster access to the information by the one or more processors. The memory device is typically a volatile, random access memory such as a dynamic random access memory (DRAM) or static memory (SRAM) or other suitable devices that facilitate information transfer to and from the one or more processors.

Although the controller is described by way of example as one type of computer system upon which various aspects of the invention may be practiced, it should be appreciated that the invention is not limited to being implemented in software, or on the computer system as exemplarily shown. Indeed, rather than implemented on, for example, a general-purpose computer system, the controller, or components or subsections thereof, may alternatively be implemented as a dedicated system or as a dedicated PLC or in a distributed controller. Further, it should be appreciated that one or more features or aspects of the invention may be implemented in software, hardware or firmware, or any combination thereof. For example, one or more segments of an algorithm executable by the one or more controllers can be performed in separate computers, which in turn, can be communication through one or more networks.

In accordance with another aspect, there is provided a non-transitory computer-readable medium having computer-readable signals stored thereon that define instructions that, as a result of being executed by a controller, cause the controller to perform a method of controlling addition of a treating agent into a wastewater stream collection system. The instructions provided to the controller may include defining a baseline dose of a treating agent sufficient to bring a concentration of an odorous species in a headspace of the wastewater stream collection system to be at or below a predetermined target value. The instructions provided to the controller may further include determining a treatment dose of the treating agent based on the baseline dose and an adjustment factor, the adjustment factor determined responsive to a measurement of at least one process variable and data regarding at least one environmental variable received from a source of environmental data. The instructions provided to the controller may additionally include generating an output signal configured to actuate a metering valve to administer the treatment dose to wastewater in the wastewater stream collection system. In some embodiments, the non-transitory computer-readable medium may include instructions for generating an output signal configured to alert a user or service provider of a status of the system, such as a volume of a storage vessel of treating agent.

In accordance with an aspect, there is provided a non-transitory computer-readable medium having a computer-readable algorithm stored thereon that defines instructions that, as a result of being executed by a controller, causes the controller to perform a method of controlling the dosage of at least one treating agent into wastewater within a wastewater stream collection system. The method to be performed upon execution of the instructions stored on the non-transitory computer-readable medium include at least a step of determining a baseline dose of the at least one treating agent sufficient to bring a concentration of $H_2S$ in a headspace of the wastewater stream collection system to be at or below a predetermined target value. The method to be performed further may include determining a treatment dose of the at least one treating agent based on the baseline dose and an adjustment factor. The method to be performed additionally may include generating an output signal configured to actuate at least one metering valve of a chemical dosage system to administer the treatment dose to wastewater in the wastewater stream collection system. The adjustment factor may be determined based on at least the measured values of at least one process variable and data regarding at least one environmental variable. The treatment dose may be in an amount sufficient to control the $H_2S$ concentration in the headspace of the wastewater stream collection system to be at or below the predetermined target value.

In some embodiments, the computer-readable algorithm stored on the non-transitory computer-readable medium may include a machine learning algorithm as described herein, such a neural network or neural net architecture.

In some embodiments, systems and methods disclosed herein include accounting for the volume of treating agent used to treat wastewater, with an indication of the volume of treating agent used directed to a billing system connected to a pre-established user account. Generally, billing systems track the consumption of a product, such as treating agent, and issue invoices to end users based on the cost per unit of the product utilized during normal operation of the system. For example, field personnel may periodically aggregate readings that measure the amount of the product consumed and report the readings to data entry personnel who enter the aggregate into the billing system. Alternatively, electronic meters may periodically transmit aggregate readings to a consolidator or another similarly centralized system that automatically enters the meter readings into the billing system. The user account may be set up to receive an invoice and then have the end user pay for the product used manually, such as by check, credit card, or other Accounts Receivable. Alternatively, the user account may be set up such that incurred charges are automatically debited from an account containing funds, such as a deposit account or similar.

In some embodiments, the billing system may be configured to bill for a direct measure or an indirect measure of odor and/or corrosion control in wastewater in the wastewater stream collection system. The billing system may be configured to bill the end user directly for the mass or volume of a treating agent used during a fixed period of time in the wastewater stream collection system, such as the number of gallons or liters used. For example, the billing system may be configured to receive measurements of the volume of a storage vessel of the treating agent at intervals of one or more days, one or more weeks, one or more months, or quarterly, and prepare a bill for the amount of treating agent used during that time period. The billing system may be further configured to reset the billing cycle once the volume of treating agent is replenished. When the billing system is configured to prepare a bill based on an indirect measure of odor and/or corrosion control in wastewater in the wastewater stream collection system, the indirect measure may be a cumulative or instantaneous concentration of an odorous species, such as $H_2S$ or a surrogate species, a cumulative or instantaneous concentration of a precursor of an odorous species, a cumulative or instantaneous flow rate of wastewater through the wastewater stream collection system, a cumulative or instantaneous total volume of wastewater treated with the wastewater stream collection system or cumulative or instantaneous measurements of the dissolved solids or suspended solids content of the wastewater.

In accordance with an aspect, there is provided a method of providing odor and/or corrosion control in a wastewater stream collection system. The method may comprise measuring at least one process variable as described herein in a wastewater stream collection system. The method may further comprise retrieving data for at least one environmental variable as described herein from a source of environmental data, such as a publicly available database. The method may further comprise determining a treatment dose of a treating agent based on an adjustment factor. The adjustment factor may be determined responsive to a measurement of the at least one process variable, such as a measurement from a sensor, and data received for the at least one environmental variable. The treatment dose may be in an amount sufficient to control a concentration of an odorous species, such as $H_2S$, in the headspace of the wastewater stream collection system to be less than a predetermined target value at a point in the wastewater stream collection system. The method may additionally comprise administering the treatment dose to wastewater in the wastewater stream collection system.

In accordance with an aspect, there is provided a method of providing odor and/or corrosion control in a wastewater stream collection system. The method may comprise measuring at least one process variable as described herein in a wastewater stream collection system. The method further may comprise retrieving data for at least one environmental variable as described herein from a source of environmental data, such as a publicly available database. In some embodiments, the environmental data may pertain to an environment proximate the wastewater stream collection system. The method may comprise determining a baseline dose of a treating agent sufficient to bring a concentration of an odorous species, e.g., $H_2S$, in a headspace of the wastewater stream collection system to be at or below a predetermined target value. The method further may comprise determining a treatment dose of the treating agent based on at least the baseline dose and an adjustment factor. The method additionally may comprise administering the treatment dose to wastewater in the wastewater stream collection system. The adjustment factor may be determined from at least a measurement of the at least one process variable or a measurement of at least one environmental variable.

In some embodiments, determining the baseline dose of the treating agent and/or the determining of the treatment dose of the treating agent may be performed using a controller as described herein, e.g., a controller programmed with a machine learning algorithm, operatively connected to at least one sensor in the wastewater stream collection system and a source of the at least one environmental variable. The controller may be trained to perform the determining of one or both of the baseline dose of the at least one treating agent or the adjustment factor. As described herein, the controller may be trained using cataloged historical data pertaining to chemical and/or meteorological conditions for the wastewater stream collection system. The cataloged historical data may include one or more of concentrations of the odorous species in the headspace is cataloged by time period, meteorological data cataloged by time period, or volume of the treating agent previously administered cataloged by time period.

In some embodiments, the adjustment factor further may be determined based on data corresponding to at least one social variable selected from population demographics, population density, or activity from one or more social media outlets.

In some embodiments of the method, the at least one process variable is selected from the group consisting of volume of the treating agent previously administered, concentration of the odorous species in the headspace, wastewater composition, wastewater pH, wastewater temperature, wastewater flow rate, wastewater conductivity, wastewater TSS, wastewater TDS, wastewater ORP, or humidity in the wastewater treatment collection system. For example, the at least one process variable may include a measured concentration of one or more chemical species in one of air in the collection system or wastewater in the collection system. The chemical species measured may include $H_2S$ in the headspace, or a precursor thereof as described herein. In some embodiments, the baseline dose of the treating agent and/or the treatment dose of the treating agent may be determined based on the at least one process variable described herein. For example, the baseline dose of the treating agent and/or the treatment dose of the treating agent may be determined based on one or more of a concentration of an odorous species in the headspace of the wastewater stream collection system, wastewater temperature, wastewater flow rate, wastewater TSS, wastewater TDS, or humidity in the wastewater stream collection system. In some embodiments of the method, the at least one environmental variable is selected from the group consisting of rainfall, outdoor temperature, outdoor relative humidity, wind speed, wind direction, and atmospheric pressure. In some embodiments, the baseline dose of the treating agent and/or the treatment dose of the treating agent may be determined based on the at least one environmental variable described herein. For example, the baseline dose of the treating agent and/or the treatment dose of the treating agent may be determined based on one or more of a time of day, outdoor temperature, outdoor relative humidity, wind direction, or atmospheric pressure.

In some embodiments, the methods further may include adjusting one or both of the baseline dose of treating agent or the determining of the adjustment factor at a predetermined frequency. For example, the predetermined frequency may be on the order of minutes, hours, daily, weekly, or any practical interval of time therebetween as described herein.

As described herein, the treatment dose of the treating agent may be further based on a baseline dose of the treating agent. The baseline dose may be predicted or may be manually set. For example, when the baseline dose is predicted, it may be predicted based on at least one temporal variable. In some implementations, prediction of the baseline dose may further include a prediction based on historical data regarding concentrations of the odorous species in the headspace, such as stored data from a sensor or other measurement device or probe. The historical data regarding concentrations of the odorous species in the headspace may be catalogued by time of day, day of week, month of the year, and annual seasonal data. The predicted baseline dose of the treating agent to be introduced to the wastewater may be substantially the same as the treatment dose of the treating agent.

In accordance with another aspect, there is provided a method of retrofitting a system configured to provide treatment in a wastewater stream collection system. The system to be retrofitted may include a source of a treating agent, a metering valve configured to administer the treating agent to the wastewater stream collection system, and at least one sensor constructed and arranged to measure at least one process variable as described herein. The method of retrofitting may comprise providing a controller as described herein configured to regulate an administered dose of the treatment composition responsive to a measurement of the at least one process variable in combination with data regarding at least one environmental variable and/or cataloged historical data regarding concentrations of $H_2S$, or surrogate species for $H_2S$ or another odorous compound, in a headspace of the wastewater stream collection system. The controller may be connectable to the metering valve and the at least one sensor. The metering valve may be configured to be actuated in response to the measurement of the at least one process variable and to deliver a dose of the treatment compound in an amount sufficient to control the $H_2S$ concentration in the headspace of the wastewater stream collection system to be less than a predetermined target value at a point in the wastewater stream collection system.

In some embodiments, the controller is connected or may be connectable to a receiver of data for the at least one environmental variable as described herein. The controller may be further connected or connectable to a user interface configured to alert a user or service provider of a status of the system. The user interface of the controller may be configured to allow a user or service provider to define predetermined values associated with the at least one process variable. For example, the user interface may be configured to allow a user or service provider to define the predetermined value of the $H_2S$ concentration in the headspace of the wastewater stream collection system. In some embodiments, the controller may be further configured to regulate the administered dose based on at least one temporal variable as described herein. In some embodiments of the method, the at least one process variable is selected from the group consisting of volume of the treating agent previously administered, concentration of the odorous species in the headspace, wastewater composition, wastewater pH, wastewater temperature, wastewater flow rate, wastewater conductivity, wastewater TSS, wastewater TDS, wastewater ORP, or humidity in the wastewater treatment collection system. For example, the at least one process variable may include a measured concentration of one or more chemical species in one of air in the collection system or wastewater in the collection system. The chemical species measured may include $H_2S$ in the headspace, or a precursor thereof or surrogate species thereof as described herein. In some embodiments of the method, the at least one environmental variable is selected from the group consisting of rainfall, outdoor temperature, outdoor relative humidity, wind speed, wind direction, and/or atmospheric pressure. The historical data regarding concentrations of the odorous species in the headspace may be catalogued by time of day, day of week, month of the year, and annual seasonal data.

In accordance with another aspect, there is provided a method of retrofitting a system configured to provide treatment in a wastewater stream collection system. The method may include providing a controller as described herein configured to perform one or more acts as described herein. The provided controller may be configured to determine a baseline dose of at least one treating agent sufficient to bring a concentration of $H_2S$ in a headspace of the wastewater stream collection system to be at or below a predetermined target value. The provided controller further may be configured to determine a treatment dose of the at least one treating agent based on the baseline dose and an adjustment factor. The adjustment factor may be determined based on at least the measured values of at least one process variable and data regarding at least one environmental variable. The treatment dose may be in an amount sufficient to control the $H_2S$ concentration in the headspace of the wastewater stream collection system to be at or below the predetermined target value. The provided controller additionally may be configured to generate an output signal configured to actuate at least one metering valve of a chemical dosage system to administer the treatment dose to wastewater in the wastewater stream collection system. The method additionally may include a step of operatively coupling the controller to a sensor for the at least one process variable and to the at least one metering valve of the chemical dosing system.

In some embodiments, the method further may include determining, by the controller as described herein, one or both of the baseline dose of the at least one treating agent or the adjustment factor based on cataloged historical data pertaining to chemical and/or meteorological conditions for the wastewater stream collection system and a comparison between the historical data and presently measured values for the chemical and/or meteorological conditions for the wastewater stream collection system. In some embodiments, the method further may include determining, by the controller, one or both of the baseline dose of the at least one treating agent or the adjustment factor based on at data corresponding to at least one social variable.

In accordance with another aspect, there is provided a method of facilitating wastewater treatment. The method may comprise providing a system configured to treat odor and control corrosion in a wastewater stream collection system. The system for treating odor and controlling corrosion may include a source of a treating agent, a metering valve configured to administer the treatment composition to the wastewater stream collection system, at least one sensor constructed and arranged to measure at least one process variable, and a receiver of data for at least one environmental variable. The method may further comprise providing a controller as described herein configured to regulate an administered dose of the treatment composition responsive to a measurement of the at least one process variable in combination with data regarding the at least one environmental variable and/or cataloged historical data regarding concentrations of $H_2S$ in a headspace of the wastewater stream collection system. The controller may be further programmed or programmable to regulate the dose administered based on at least one temporal variable. The method may further comprise instructing a user to connect the system to the controller. The method may additionally comprise instructing a user to fluidly connect the system to the wastewater stream collection system requiring odor treatment and corrosion control.

In some embodiments, the method may further include providing the treating agent. In some implementations, the method may further include instructing the user to establish a connection between the controller and a cloud-based memory storage configured to process and store data associated with historic values of the at least one process variable, the at least one environmental variable, and cataloged historical data regarding concentrations of $H_2S$ in a headspace of the wastewater stream collection system.

In some embodiments, the cloud-based memory storage may be programmed to inform a user or service provider of a status of the system. For example, the cloud-based memory storage may be programmed to inform a user or service provider of a need to replenish the treating agent. In such situations, the method may additionally include providing the treating agent responsive to the alert. In some implementations, the cloud-based memory storage may be programmed to inform a user or service provider of maintenance and/or service requirements of the system. For example, the cloud-based memory storage may be programmed to inform a user or service provider when a sensor is not functioning properly (such as a reading of no data) or if a sensor returns an abnormal measurement (such as a pressure spike or flow rate drop due to a blockage in a line of the wastewater stream collection system). Alternatively, or in addition, the status of the system may be a volume of the treating agent used in treating the wastewater stream collection system. The measured volume of the treating agent may be transmitted to a billing system as described herein that is connected to a user account.

In some embodiments of the method, the at least one process variable is selected from the group consisting of volume of the treating agent previously administered, concentration of the odorous species in the headspace, wastewater composition, wastewater pH, wastewater temperature, wastewater flow rate, wastewater conductivity, wastewater TSS, wastewater TDS, wastewater ORP, and/or humidity in the wastewater treatment collection system. For example, the at least one process variable may include a measured concentration of one or more chemical species in one of air in the collection system or wastewater in the collection system. The chemical species measured may include $H_2S$ in the headspace, a precursor thereof, or surrogate species thereof as described herein. In some embodiments of the method, the at least one environmental variable is selected from the group consisting of rainfall, outdoor temperature, outdoor relative humidity, wind speed, wind direction, and atmospheric pressure. The historical data regarding concentrations of the odorous species in the headspace may be catalogued by time of day, day of week, month of the year, and annual seasonal data.

The function and advantages of the embodiments discussed above and other embodiments of the invention can be further understood from the description of the figures below, which further illustrate the benefits and/or advantages of the one or more systems and techniques of the invention but do not exemplify the full scope of the invention.

As shown in FIG. 1, a wastewater treatment management system 100 comprises a plurality of monitoring stations 102, each of which is situated in a wastewater stream collection system 150. The wastewater treatment management system 100 further comprises a treating station 104 disposed remotely from at least one of the plurality of monitoring stations 102. The treating station is configured to introduce at least one treating agent into the wastewater stream collection system at a predetermined dosage rate by opening a metering valve connected to a source of the at least one treating agent. Each of the plurality of monitoring stations 102 includes at least one sensor 108 configured to determine a level of at least one target species at respective locations of the collection system. The wastewater treatment management system 100 additionally comprises a principal processing facility 106 disposed remotely from at least one of the plurality of monitoring stations 102. The at least one sensor 108 is configured to transmit a representation of the determined level of the at least one target species to the principal processing facility 106; this is shown as the dot-dash arrow line from each sensor 108 directed towards the principal processing facility 106. The principal processing facility 106 may comprise a controller 110 where the determinations of the dosage rates of the at least one treating agent are calculated. The controller 110 of the principal processing facility 106 is configured to transmit an indicator of the adjusted dosage to the treating station 104; this is shown as the dashed arrow line from the principal processing facility 106 to the treating station 104. The treating station 104 is further configured to receive the indicator of the adjusted dosage and introduce the at least one treating agent to the wastewater stream collection system at the adjusted dosage. The wastewater treatment management system 100 may further comprise an aeration system 112 configured to deliver an oxygen containing gas into the wastewater stream collection system. If included, the aeration system 112 may be connected to any point in the wastewater stream collection system where the introduction of an oxygen containing gas is desirable.

Figure 2:
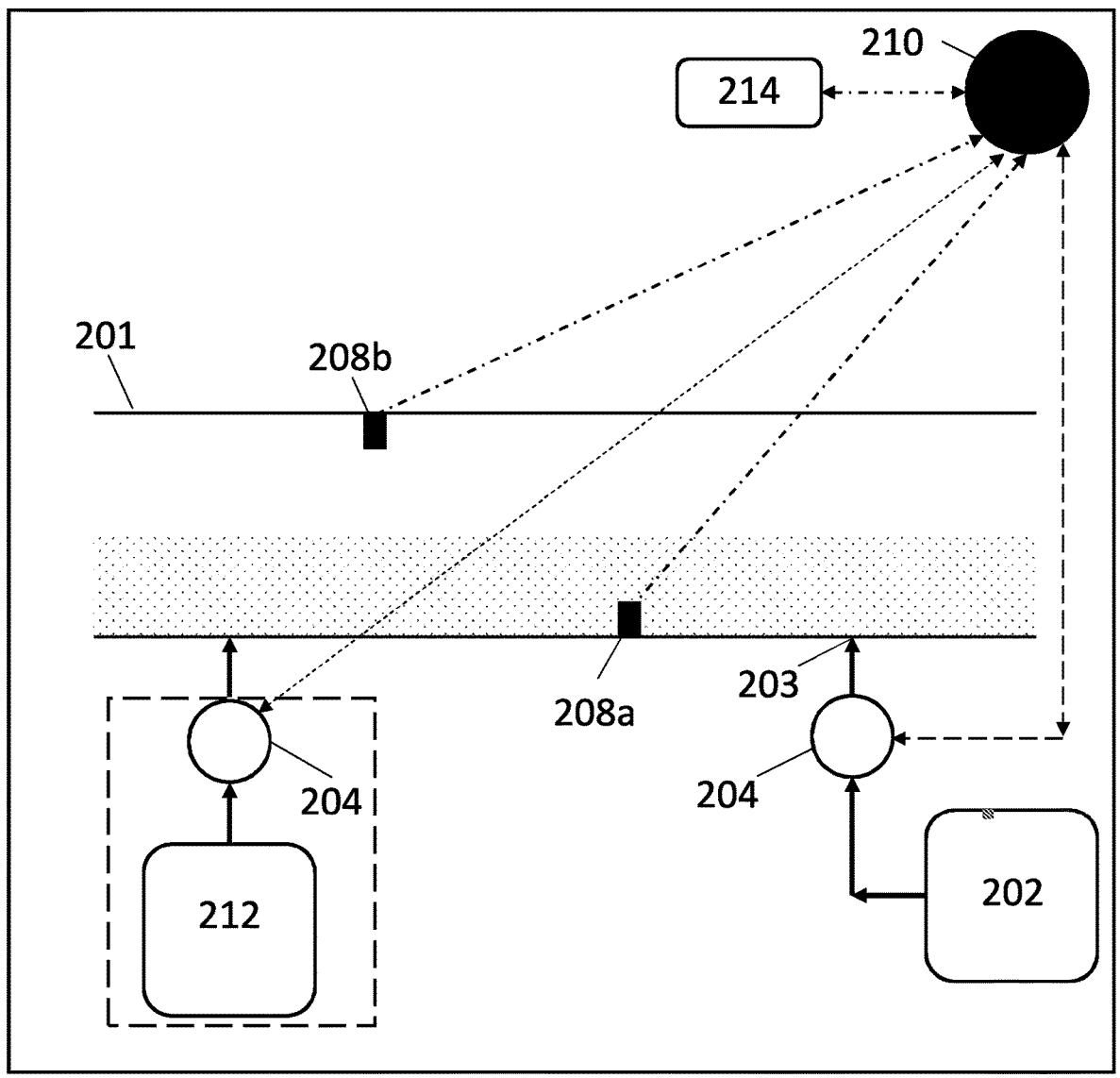
FIG. 2 is a schematic of a system configured to treat a wastewater stream, according to an embodiment.

As shown in FIG. 2, a system configured to treat a wastewater stream collection system 200 comprises a source of a treating agent 202 connectable to the wastewater stream collection system, such as conduit 201, at a point of administration 203. The system configured to treat the wastewater stream collection system 200 further comprises a metering valve 204 positioned at or proximate the point of administration 203 configured to administer the treating agent to the wastewater stream collection system 200. The system configured to treat the wastewater stream collection system 200 further comprises at least one sensor 208a, 208b constructed and arranged to measure at least one process variable from the wastewater stream collection system. The at least one sensor may be positioned in the liquid wastewater, shown as sensor 208a in the patterned area of conduit 201 representing wastewater and/or may be positioned to sample the headspace of a location of the wastewater stream collection system, shown as sensor 208b. The system configured to treat the wastewater stream collection system 200 additionally comprises a controller 210 operatively connected to the metering valve 204 and the at least one sensor 208a, 208b. The controller 210 is configured to regulate an administered dose of the treating agent responsive to a measurement of at least one process variable measured by the at least one sensor 208a, 208b in combination with data of at least one environmental variable received from a source of environmental data 214 and historical data from the at least one sensor. The transmitted representation of the at least one process variable from the at least one sensor 208a, 208b is shown as the dot-dash arrow line from each sensor 208a, 208b directed towards the controller 210. The controller 210 is programmed to automatically adjust a treatment dose of the treating agent based an adjustment factor that is determined responsive to a measurement of the at least one process variable from the at least one sensor 208a, 208b and data on the at least one environmental variable received from the source of environmental data 214. The signal that controls the metering valve 214 is shown as the dashed arrow line from the controller 210 to the metering valve 204. The system configured to treat a wastewater stream collection system 200 may further comprise an aeration system 212 configured to deliver an oxygen containing gas into the wastewater stream collection system. If included, the aeration system 212 may be connected to any point in the wastewater stream collection system where the introduction of an oxygen containing gas is desirable. A metering valve 204, in communication with and operable to receive instructions from the controller 210 to start, stop, or regulate flow of oxygen containing gas from the aeration system 212 into the conduit 210 is operationally disposed between the aeration system 212 and a point of introduction of the oxygen containing gas into the conduit 201.

Figure 3:
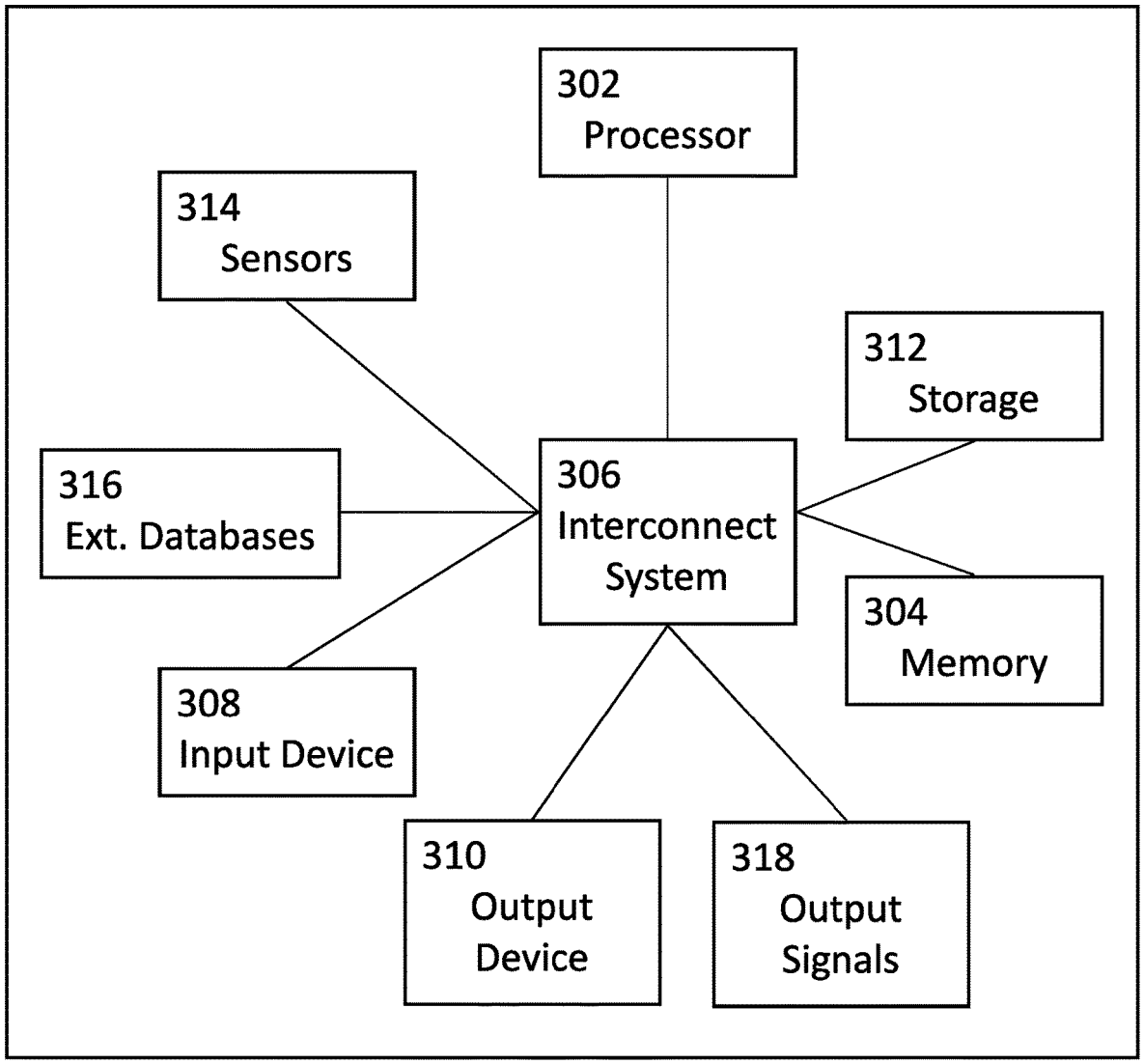
FIG. 3 is a block diagram of a controller included in embodiments of systems and methods disclosed herein.

As shown in FIG. 3, a controller 300 for use in systems as disclosed herein may include a processor 302 connected to one or more memory devices 304, such as a disk drive, solid state memory, or other device for storing data. Memory 304 is typically used for storing programs and data during operation of the computer controller 300, such as a machine learning algorithm. The various components of the controller 300 are coupled to an interconnection mechanism 306, which may include one or more busses (e.g., between components that are integrated within a same machine) and/or a network (e.g., between components that reside on separate discrete machines). The interconnection mechanism 306 enables communications (e.g., data, instructions) to be exchanged between system components connected to the controller 300. The controller 300 includes one or more input devices 308, for example, a keyboard, mouse, trackball, microphone, or display screen, i.e., a user interface, which may include a touch sensitive screen, through which an operator may issue commands or programming to the controller 300. Controller 300 includes one or more output devices 310, for example, a printing device, display screen, and/or a speaker. At least one sensor 314 may also provide input to the controller 300. These sensors may include, for example, sensors that are constructed and arranged to measure at least one of a process variable, for example, a volume of a treating agent previously administered, $H_2S$ concentration in the headspace, wastewater composition, wastewater pH, wastewater temperature, wastewater flow rate, wastewater conductivity, wastewater TSS, wastewater TDS, wastewater ORP, or humidity in the wastewater stream collection system. The storage 312 of the controller 300 typically includes a computer readable and writeable non-volatile recording medium in which signals are stored that define a program to be executed by the controller or information to be processed by the controller 300, including stored historical data on at least one environmental variable. The controller 300 includes connections to external databases 316 that store catalogued data on any number of process or environmental variables that can be accessed by the processor 302 when executing the instructions stored on storage 312. The controller is configured to provide output signals 318 that are configured to control a component of an external system, including metering valves that are in communication with sources of at least one treating agent. The controller may be in bi-directional communication with an external system, for example, a centralized control system or cloud-based system that may include another processor 302 and database 316, for example, a system such as the processing facility 106 of FIG. 1 and may transmit data from the sensors to the external system and receive instructions from the external system for adjusting one or more process parameters of the wastewater stream collection system, for example, chemical dosing rates and/or aeration rate.

Figure 4:
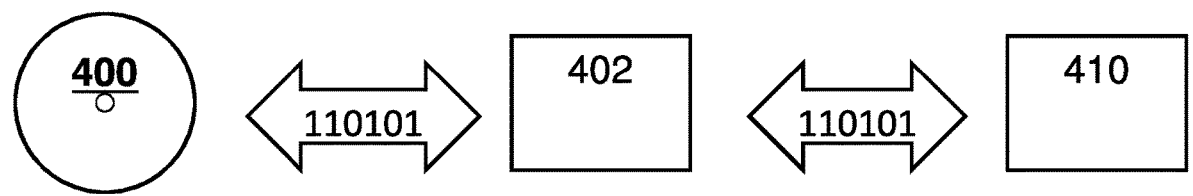
FIG. 4 is a block diagram of a memory system included in embodiments of the controller of FIG. 3.

As shown in FIG. 4, non-transitory computer-readable medium 400 may be provided having computer-readable signals stored thereon that define a program to be executed by a controller as described herein or information to be processed by a controller 410 as described herein, for example, controller 300 described above comprising an algorithm, e.g., a machine learning algorithm, configured to operate the wastewater stream collection system or one or more components thereof. The computer-readable medium may include, for example, a disk or flash memory. Typically, in operation, the controller 410 causes data to be read from the computer-readable medium 400 into another memory 402 that allows for faster access to the information by the controller 410 than does the computer-readable medium 400. This memory 402 is typically a volatile, random access memory such as DRAM OR SRAM as described herein. The controller 410 generally manipulates the data within its internal memory and then copies the data to the computer-readable medium 400 after processing is completed. A variety of mechanisms are known for managing data movement between the computer-readable medium 400 and the internal memory of the controller 410, and embodiments disclosed herein are not limited to any particular data movement mechanism.

Figure 5:
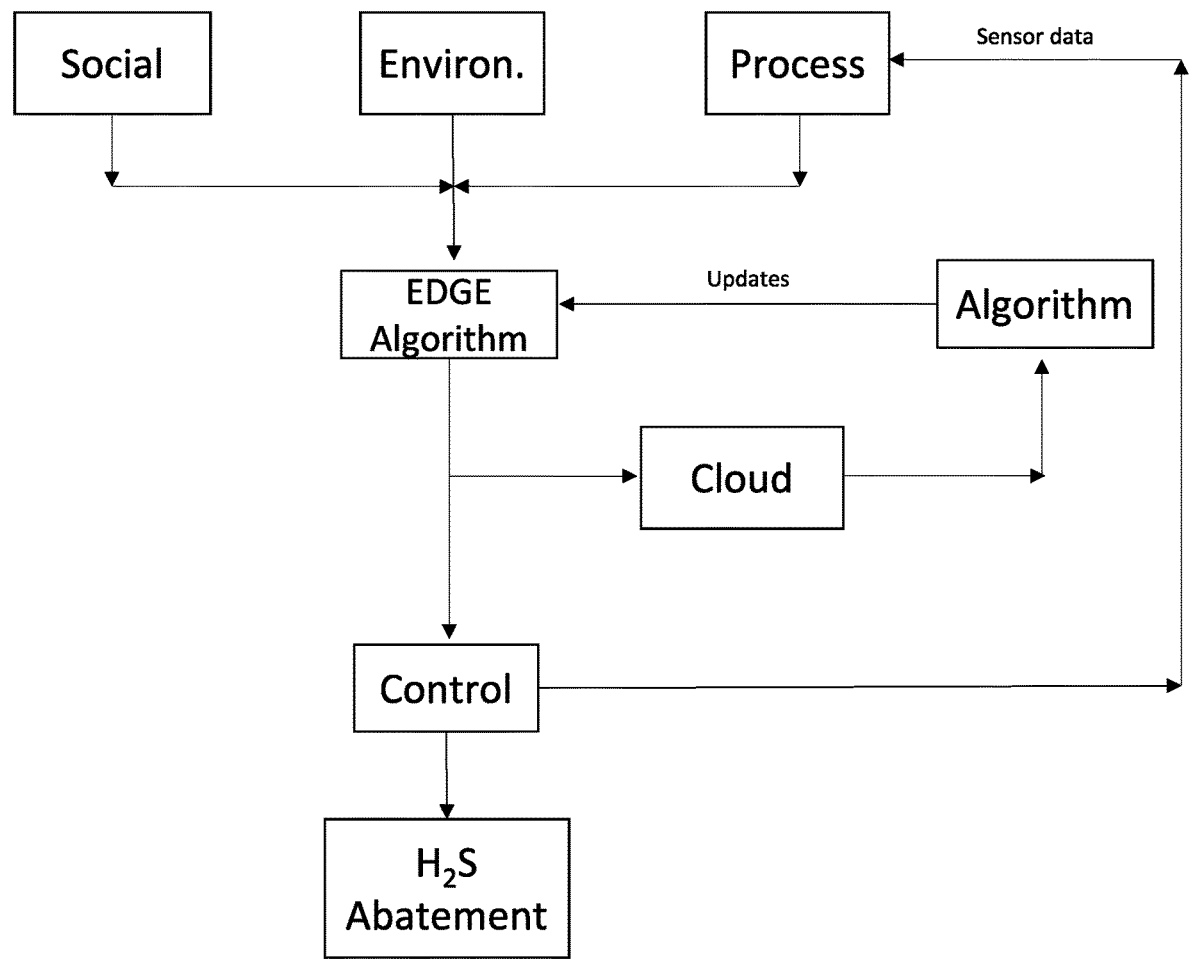
FIG. 5 is a schematic of a control scheme used to regulate the dosage of a treating agent added to wastewater, according to an embodiment.

FIG. 5 illustrates a basic schematic of the use of an algorithm as described herein, e.g., a machine learning algorithm distributed over an EDGE computing platform, to dose wastewater in a wastewater stream collection system with at least one treating agent. As illustrated, data corresponding to at least one social variable, at least one environmental variable, and at least process variable is directed to a portion of a machine learning algorithm stored on a memory device of an EDGE computing platform positioned in the vicinity of the wastewater stream collection system. The algorithm on the cloud is trained with historical data. The relevant data from sensors and databases is sent to a portion of the algorithm on an EDGE device nearby that controls the dosing. The controller doses the treating agent and collects $H_2S$ measurements that are sent to the cloud to update the main algorithm. The updated algorithm is the sent to the EDGE device for further treatment cycles.

Figure 6:
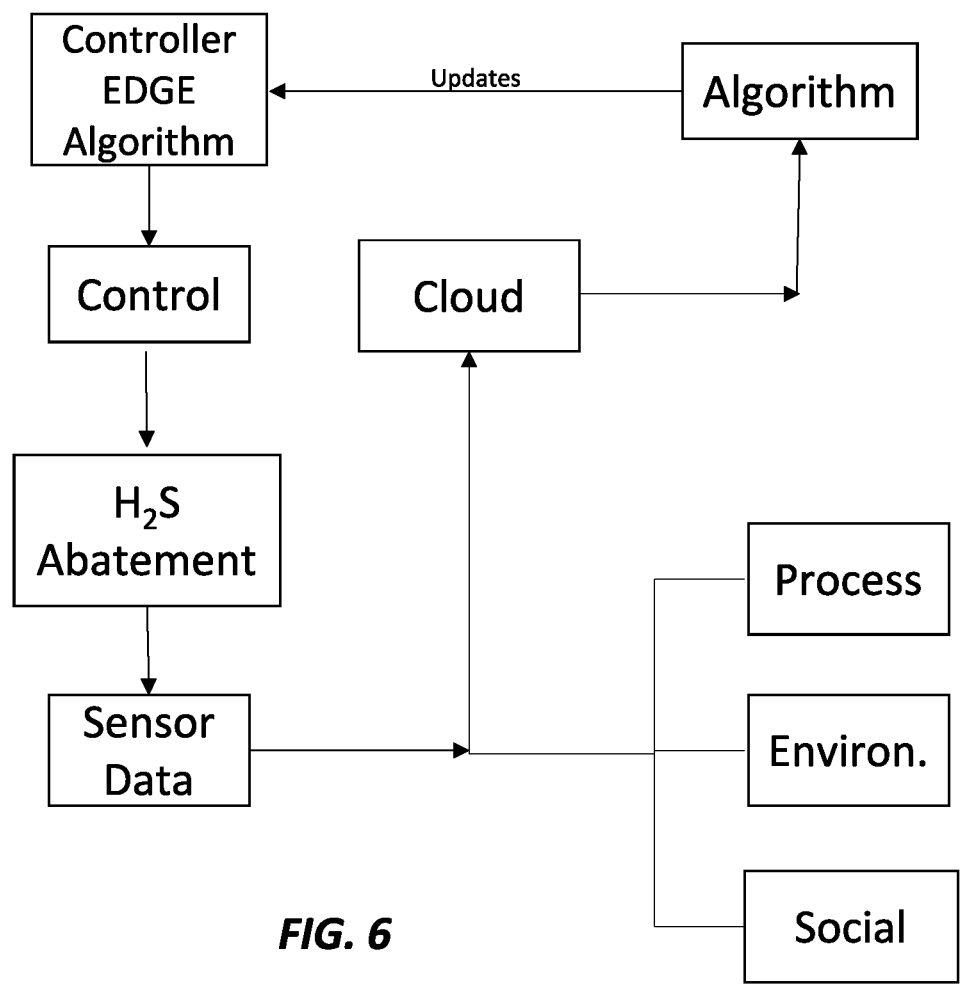
FIG. 6 illustrates a flow of data through components of a control system as disclosed herein.

FIG. 6 illustrates the flow of data in an example of a control system for a treatment system for a wastewater stream collection system as disclosed herein. As illustrated in FIG. 6, the EDGE algorithm provides the control strategy or methodology for the treatment being provided. The controller sends a signal to the treatment method based on the EDGE algorithm. Sensors measure the results of treatment of the wastewater in the wastewater stream collection system. Those results are stored in the controller on in the cloud. For example, Vaporlink® sensors send data directly to the cloud. The cloud-based system aggregates available data sources. This includes sensor, process, environmental, and social data. This aggregated data is used to validate the EDGE algorithm accuracy and to update the EDGE algorithm based on newest available data.

The phraseology and terminology used herein is for the purpose of description and should not be regarded as limiting. As used herein, the term "plurality" refers to two or more items or components. The terms "comprising," "including," "carrying," "having," "containing," and "involving," whether in the written description or the claims and the like, are open-ended terms, i.e., to mean "including but not limited to." Thus, the use of such terms is meant to encompass the items listed thereafter, and equivalents thereof, as well as additional items. Only the transitional phrases "consisting of" and "consisting essentially of," are closed or semi-closed transitional phrases, respectively, with respect to the claims. Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Having thus described several aspects of at least one embodiment, it is to be appreciated various alterations, modifications, and improvements will readily occur to those skilled in the art. Any feature described in any embodiment may be included in or substituted for any feature of any other embodiment. Such alterations, modifications, and improvements are intended to be part of this disclosure and are intended to be within the scope of the invention. Accordingly, the foregoing description and drawings are by way of example only.

Those skilled in the art should appreciate that the parameters and configurations described herein are exemplary and that actual parameters and/or configurations will depend on the specific application in which the disclosed methods and materials are used. Those skilled in the art should also recognize or be able to ascertain, using no more than routine experimentation, equivalents to the specific embodiments disclosed.

What is claimed is:

1. A wastewater treatment management system, comprising:
   a plurality of monitoring stations each situated in a wastewater stream collection system, each of the monitoring stations having at least one sensor configured to determine a level of at least one target species at respective locations of the wastewater stream collection system, and to transmit a representation of the determined level of the at least one target species;
   a plurality of treating stations disposed remotely from at least one of the plurality of monitoring stations, each treating station configured to introduce at least one treating agent into the wastewater stream collection system at respective dosage rates; and
   a principal processing facility disposed remotely from at least one of the plurality of monitoring stations, the principal processing facility configured to receive the transmitted representation and to determine an adjusted dosage of the at least one treating agent based on data retrieved from a public database, the principal processing facility further configured to transmit an indicator of the adjusted dosage to the treating station, and to adjust operation of one or more of the plurality of treating stations to compensate for undesired operation of one or more other of the plurality of treating stations;
   wherein the treating station is further configured to receive the indicator of the adjusted dosage and introduce the at least one treating agent at the adjusted dosage.

2. The system of claim 1, wherein the at least one treating agent comprises at least one of an anthraquinone, a pH-adjusting compound, a nitrite, a nitrate, sodium chlorite, hydrogen peroxide, or an iron salt solution.

3. The system of claim 1, wherein each of the plurality of monitoring stations comprises a cellular modem configured to transmit the representation to the processing facility according to a predetermined schedule.

4. The system of claim 1, wherein the data includes environmental data regarding one or more of precipitation, outdoor temperature, outdoor relative humidity, wind speed, wind direction, and atmospheric pressure.

5. The system of claim 1, wherein the at least one sensor is configured to determine a concentration of one of $H_2S$ or a precursor for $H_2S$ in one of air or water within the collection system.

6. The system of claim 1, further comprising an aeration system configured to deliver an oxygen containing gas into the wastewater.

7. A method of providing odor and/or corrosion control in a wastewater stream collection system, the method comprising:
   measuring at least one process variable in a wastewater stream collection system, the at least one process variable including a concentration of hydrogen sulfide gas ($H_2S$) or a precursor thereof within the wastewater stream collection system;
   retrieving data for at least one environmental variable from a source of environmental data;
   determining a treatment dose of a treating agent based on a baseline dose of the treating agent and an adjustment factor, the baseline dose of the treating agent being a minimum dose of the treating agent sufficient to maintain the concentration of $H_2S$ or the precursor thereof at or below a predetermined target value, the adjustment factor determined responsive to a measurement of the at least one process variable, and data received for the at least one environmental variable, the treatment dose being in an amount sufficient to control the concentration of hydrogen sulfide gas ($H_2S$) or a precursor thereof in a headspace of the wastewater stream collection system to be less than the predetermined target value at a point in the wastewater stream collection system; and administering the treatment dose to wastewater in the wastewater stream collection system.

8. The method of claim 7, wherein the at least one process variable further includes a process variable selected from the group consisting of volume of the treating agent previously administered, wastewater composition, wastewater pH, wastewater temperature, wastewater flow rate, wastewater conductivity, wastewater TSS, wastewater TDS, wastewater ORP, sulfide concentration in the wastewater, treating agent residual in the wastewater, wastewater BOD, wastewater COD, and humidity in the collection system.

9. The method of claim 7, wherein the at least one environmental variable is selected from the group consisting of precipitation outdoor temperature, outdoor relative humidity, wind speed, wind direction, and atmospheric pressure.

10. The method of claim 7, wherein the baseline dose is predicted based on at least one temporal variable.

11. The method of claim 7, wherein the baseline dose is manually set.

12. The method of claim 7, further comprising predicting the baseline dose of the treating agent from historical data regarding concentrations of the odorous species in the headspace.

13. The method of claim 12, wherein the historical data regarding concentrations of the odorous species in the headspace is catalogued by time of day, day of week, month of the year, and annual seasonal data.

14. The method of claim 7, wherein the baseline dose and the treatment dose of the treating agent are the same.

15. The method of claim 7, wherein the at least one process variable includes a concentration of one or more chemical species in one of air in the collection system or wastewater in the collection system.

16. A system configured to treat a wastewater stream collection system, the system comprising:
a source of a treating agent connectable to the wastewater stream collection system at a point of administration;
a metering valve positioned at the point of administration configured to administer the treating agent to the wastewater stream collection system;
at least one sensor constructed and arranged to measure at least one process variable from the wastewater stream collection system; and
a controller operatively connected to the metering valve and the at least one sensor, the controller configured to regulate an administered dose of the treating agent responsive to a measurement of the at least one process variable in combination with data of at least one environmental variable received, historical data from the at least one sensor, and responsive to population demographics or traffic patterns in a region proximate the wastewater stream collection system, the controller programmable to automatically adjust a treatment dose of the treating agent based on an adjustment factor, the adjustment factor determined responsive to a measurement of the at least one process variable and data on the at least one environmental variable, the treatment dose being in an amount sufficient to control a concentration of $H_2S$ in the wastewater stream collection system to be less than a predetermined target value.

17. The system of claim 16, further comprising an aeration system configured to deliver an oxygen containing gas into wastewater in the wastewater stream collection system.

18. The system of claim 17, wherein the controller is further configured to regulate a rate or volume of the oxygen containing gas delivered into the wastewater responsive to the measurement of the at least one process variable and/or the at least one environmental variable.

19. The system of claim 16, further comprising a receiver of data for the at least one environmental variable.

20. The system of claim 16, wherein the at least one process variable is selected from the group consisting of volume of the treating agent previously administered, $H_2S$ concentration in a headspace of the collection system, wastewater composition, wastewater pH, wastewater temperature, wastewater flow rate, wastewater conductivity, wastewater TSS, wastewater TDS, wastewater ORP, sulfide concentration in the wastewater, treating agent residual in the wastewater, wastewater BOD, wastewater COD, and humidity in the collection system.

21. The system of claim 16, wherein the at least one environmental variable is selected from the group consisting of precipitation, outdoor temperature, outdoor relative humidity, wind speed, wind direction, and atmospheric pressure.

22. The system of claim 16, wherein the controller is further programmable to predict a baseline dose of the treating agent sufficient to bring the concentration of $H_2S$ in the wastewater stream collection system to be below the predetermined target value.

23. The system of claim 22, wherein the controller is further programmable to determine the treatment dose based on the baseline dose and the adjustment factor.

24. The system of claim 22, wherein the baseline dose is defined based on at least one temporal variable.

25. The system of claim 16, wherein the historical data from the at least one sensor is catalogued by time of day, day of week, month of the year, and annual seasonal data.

26. The system of claim 16, wherein the at least one sensor is positioned to measure the at least one process variable downstream from the point of administration of the treating agent.

27. The system of claim 16, wherein the controller is further programmable to instruct the metering valve to administer the treatment dose of the treating agent.

28. The system of claim 16, wherein the controller is further configured to collect and store data from the at least one process variable measured by the at least one sensor.

29. The system of claim 28, wherein the controller is further configured to collect and store data regarding $H_2S$ concentrations measured in a headspace of the wastewater stream collection system.

30. The system of claim 16, wherein the predetermined target value is from about 5 ppm to about 100 ppm.

31. The system of claim 16, wherein the controller is further configured to alert a user or service provider of a status of the system.

* * * * *